(12) United States Patent
Huang et al.

(10) Patent No.: US 9,619,646 B2
(45) Date of Patent: Apr. 11, 2017

(54) ACCESS CONTROL FOR WIRELESS DOCKING

(71) Applicant: QUALCOMM Incorporated, San Diego, CA (US)

(72) Inventors: Xiaolong Huang, San Jose, CA (US); Rolf De Vegt, San Francisco, CA (US); Andrew Mackinnon Davidson, Monte Sereno, CA (US); Vijayalakshmi Rajasundaram Raveendran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 73 days.

(21) Appl. No.: 14/265,809

(22) Filed: Apr. 30, 2014

(65) Prior Publication Data

US 2014/0351927 A1 Nov. 27, 2014

Related U.S. Application Data

(60) Provisional application No. 61/827,475, filed on May 24, 2013.

(51) Int. Cl.
*G06F 21/44* (2013.01)
*H04W 12/06* (2009.01)
(Continued)

(52) U.S. Cl.
CPC ............ *G06F 21/44* (2013.01); *H04W 12/06* (2013.01); *H04W 76/023* (2013.01); *G06F 1/1632* (2013.01); *H04L 63/083* (2013.01)

(58) Field of Classification Search
CPC ..... G06F 21/44; G06F 1/1632; H04L 63/083; H04M 1/7253; H04M 1/72569;
(Continued)

(56) References Cited

U.S. PATENT DOCUMENTS 6,170,026 B1 1/2001 Kimura et al.
6,282,590 B1 8/2001 Ellis et al.
(Continued)

FOREIGN PATENT DOCUMENTS

EP 2555490 A2 2/2013
JP 2004179872 A 6/2004
(Continued)

OTHER PUBLICATIONS

International Search Report and Written Opinion from International Application No. PCT/US2014/036442, dated Jul. 25, 2014, 11 pp.
(Continued)

*Primary Examiner* — Thanhnga B Truong
(74) *Attorney, Agent, or Firm* — Shumaker & Sieffert, P.A.

(57) ABSTRACT

In one example, a method includes receiving, by a wireless docking center (WDC) and from a wireless dockee (WD), a request to access one or more peripheral functions (PFs) associated with the WDC, and receiving, by the WDC and from the WD, one or more authentication credentials. In this example, the method also includes determining, by the WDC, whether or not the one or more authentication credentials received from the WD grant access to the one or more PFs to which the WD requests access. In this example, the method also includes permitting, by the WDC, the WD to access a first PF of the one or more PFs to which the WD requests access in response to determining that the one or more authentication credentials grant access to the first PF.

18 Claims, 16 Drawing Sheets

(51) Int. Cl.
*H04W 76/02* (2009.01)
*G06F 1/16* (2006.01)
*H04L 29/06* (2006.01)

(58) Field of Classification Search
CPC ........ H02J 5/005; H02J 7/025; H04B 5/0037; H04B 5/0062; H04B 7/26; H04W 4/008; H04W 12/06; H04W 76/023; H04W 74/00; H04W 52/0267
USPC .......... 726/19; 455/411, 41.2; 340/5.1, 10.1; 710/303
See application file for complete search history.

(56) References Cited

U.S. PATENT DOCUMENTS

| | | | |
|---|---|---|---|
| 8,462,734 B2 | 6/2013 | Laine et al. | |
| 8,472,436 B2 | 6/2013 | Meiri et al. | |
| 8,554,970 B2 | 10/2013 | Suumaki et al. | |
| 8,566,498 B2 | 10/2013 | Lemarchand et al. | |
| 8,973,078 B2 | 3/2015 | Nagara et al. | |
| 9,131,335 B2 | 9/2015 | Huttunen et al. | |
| 2002/0169977 A1 | 11/2002 | Chmaytelli | |
| 2002/0186329 A1 | 12/2002 | Tong et al. | |
| 2006/0233191 A1 | 10/2006 | Pirzada et al. | |
| 2007/0141986 A1 | 6/2007 | Kuehnel et al. | |
| 2008/0070501 A1 | 3/2008 | Wyld | |
| 2008/0195788 A1 | 8/2008 | Tamir et al. | |
| 2008/0252419 A1* | 10/2008 | Batchelor | G06F 1/1632 340/10.1 |
| 2009/0063744 A1 | 3/2009 | Krueger et al. | |
| 2010/0057969 A1* | 3/2010 | Meiri | G06F 1/1632 710/303 |
| 2011/0149806 A1 | 6/2011 | Verma et al. | |
| 2011/0162035 A1 | 6/2011 | King et al. | |
| 2011/0188391 A1 | 8/2011 | Sella et al. | |
| 2012/0099566 A1 | 4/2012 | Laine et al. | |
| 2012/0218918 A1 | 8/2012 | Takae et al. | |
| 2012/0265913 A1 | 10/2012 | Suumaeki et al. | |
| 2012/0304280 A1 | 11/2012 | Hayashida | |
| 2013/0304959 A1 | 11/2013 | Chiang | |
| 2013/0307665 A1* | 11/2013 | Wang | H04M 1/7253 340/5.1 |
| 2014/0013014 A1 | 1/2014 | Huang et al. | |
| 2014/0146745 A1 | 5/2014 | Huang et al. | |
| 2014/0201415 A1 | 7/2014 | Huang | |
| 2014/0349578 A1 | 11/2014 | Huang et al. | |
| 2014/0351475 A1 | 11/2014 | Huang et al. | |
| 2014/0351476 A1 | 11/2014 | Huang et al. | |
| 2015/0016417 A1 | 1/2015 | Dees et al. | |
| 2015/0056920 A1* | 2/2015 | Huttunen | H04B 7/26 455/41.2 |
| 2015/0100715 A1 | 4/2015 | Huang et al. | |
| 2015/0206190 A1 | 7/2015 | Lee et al. | |

FOREIGN PATENT DOCUMENTS

| | | |
|---|---|---|
| JP | 2004272376 A | 9/2004 |
| JP | 2009521190 A | 5/2009 |
| JP | 2009540720 A | 11/2009 |
| JP | 2011249960 A | 12/2011 |
| JP | 2012175614 A | 9/2012 |
| WO | 2007144692 A1 | 12/2007 |
| WO | 2010110956 A2 | 9/2010 |
| WO | 2012129492 A1 | 9/2012 |
| WO | 2013038359 A1 | 3/2013 |
| WO | 2014057465 A1 | 4/2014 |
| WO | 2014069965 A1 | 5/2014 |

OTHER PUBLICATIONS

Wi-Fi Alliance: "Wi-Fi Certified Wi-Fi Direc," XP055041124, Oct. 2010, 14 pp.
"Wi-Fi Peer-to-Peer (P2P) Specification v1.2", Wi-Fi Peer-To-Peer (P2P) Specification V 1.2, Wi-Fi Alliance, US, vol. V 1.2, 2010, XP008165048, Mar. 30, 2014 159 pp.
Tieu, et al., "Wi-Fi Direct Services," Jun. 1, 2014; XP055158480, Retrieved from the Internet: URL:http://www.eit.lth.se/sprapport. php?uid=818, 73 pp.
Response to Written Opinion dated Jul. 25, 2014, from International Application No. PCT/US2014/036442, filed on Mar. 23, 2015, 5 pp.
Second Written Opinion from International Application No. PCT/US2014/036442, dated Apr. 29, 2015, 7 pp.
Response to Written Opinion dated Apr. 29, 2015, from International Application No. PCT/US2014/036442, filed on Jun. 26, 2015, 22 pp.
International Preliminary Report on Patentability from International Application No. PCT/US2014/036442, dated Sep. 25, 2015, 20 pp.

\* cited by examiner

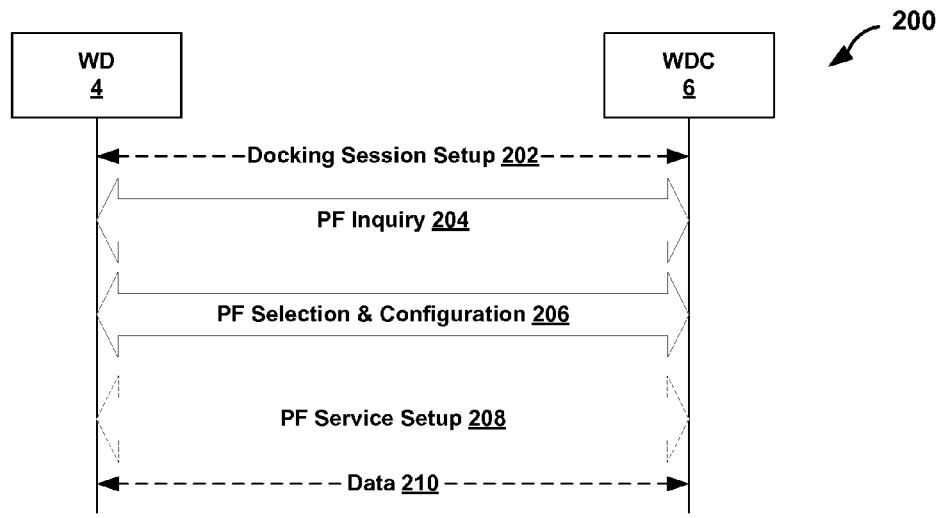
FIG. 2 - Example Docking Configuration & Control Procedures for PFs
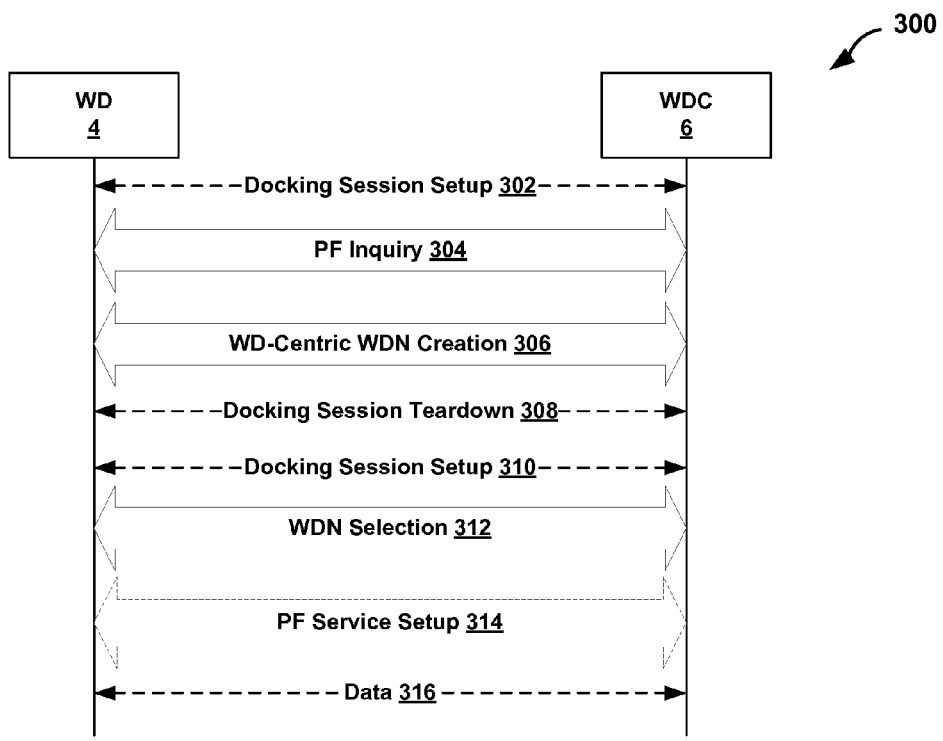
FIG. 3 - Example Docking Configuration & Control Procedures for WDNs (DETAILED VIEWS IN FIGS. 5A-5D)

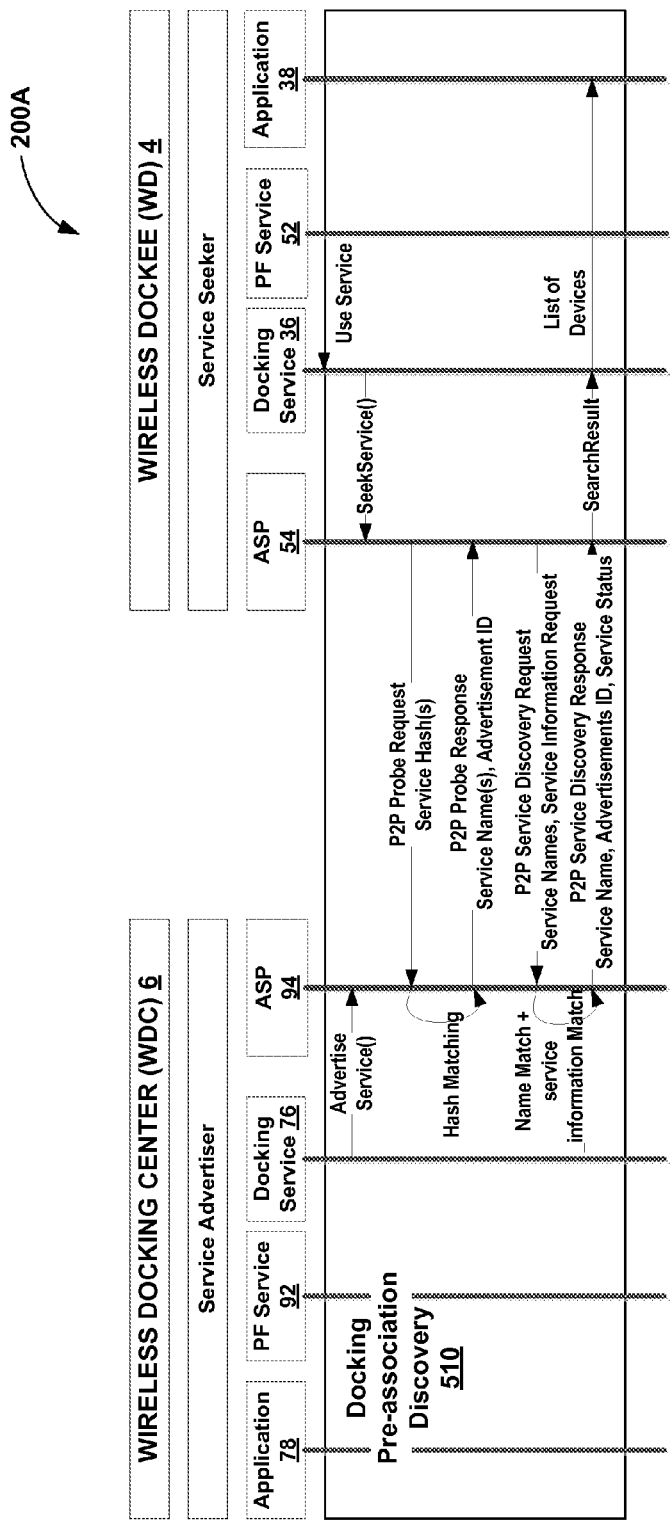
FIG. 5A - Wi-Fi Docking Service Setup Procedures:
Docking Pre-association Discovery

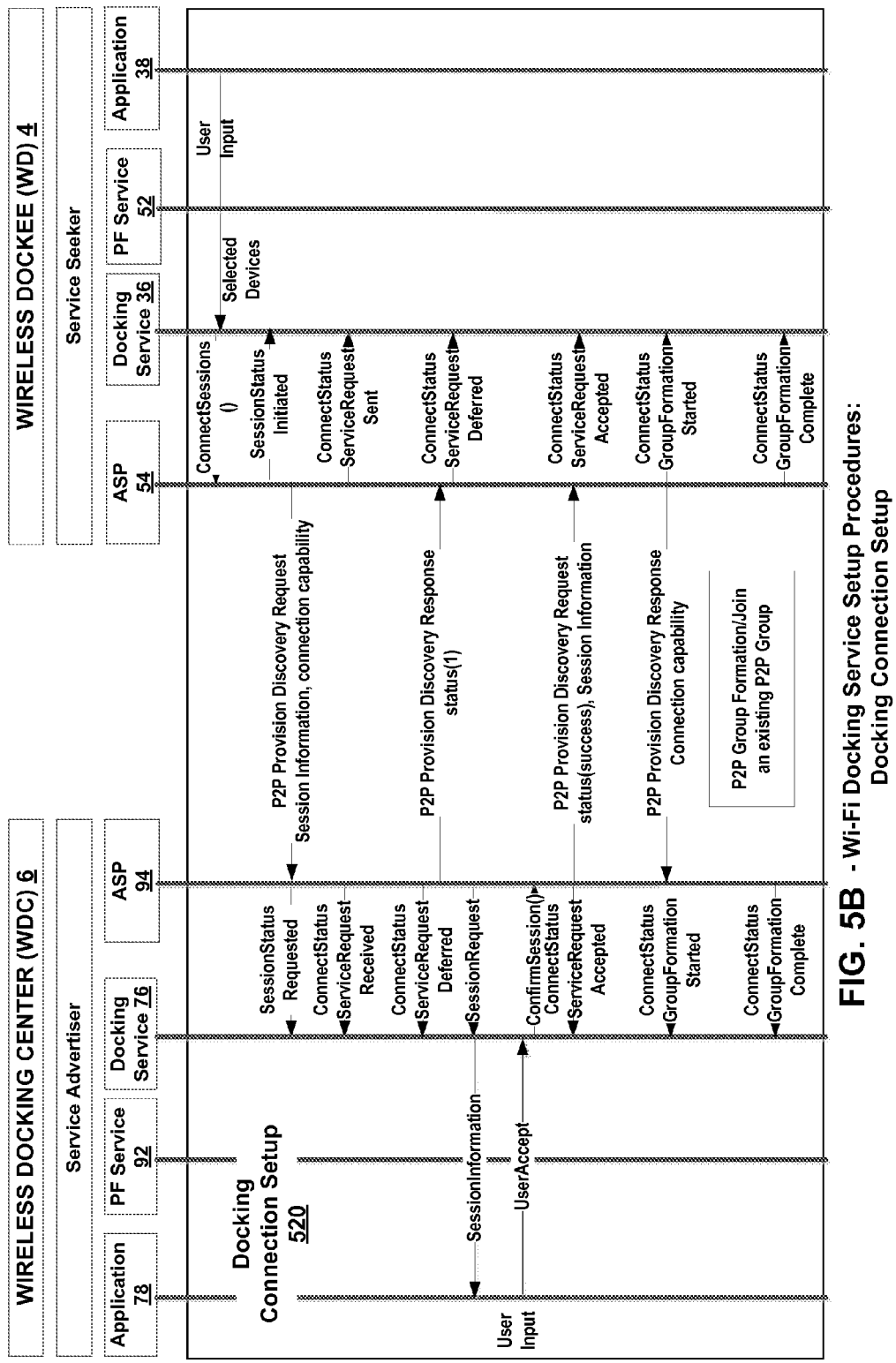
FIG. 5B - Wi-Fi Docking Service Setup Procedures: Docking Connection Setup

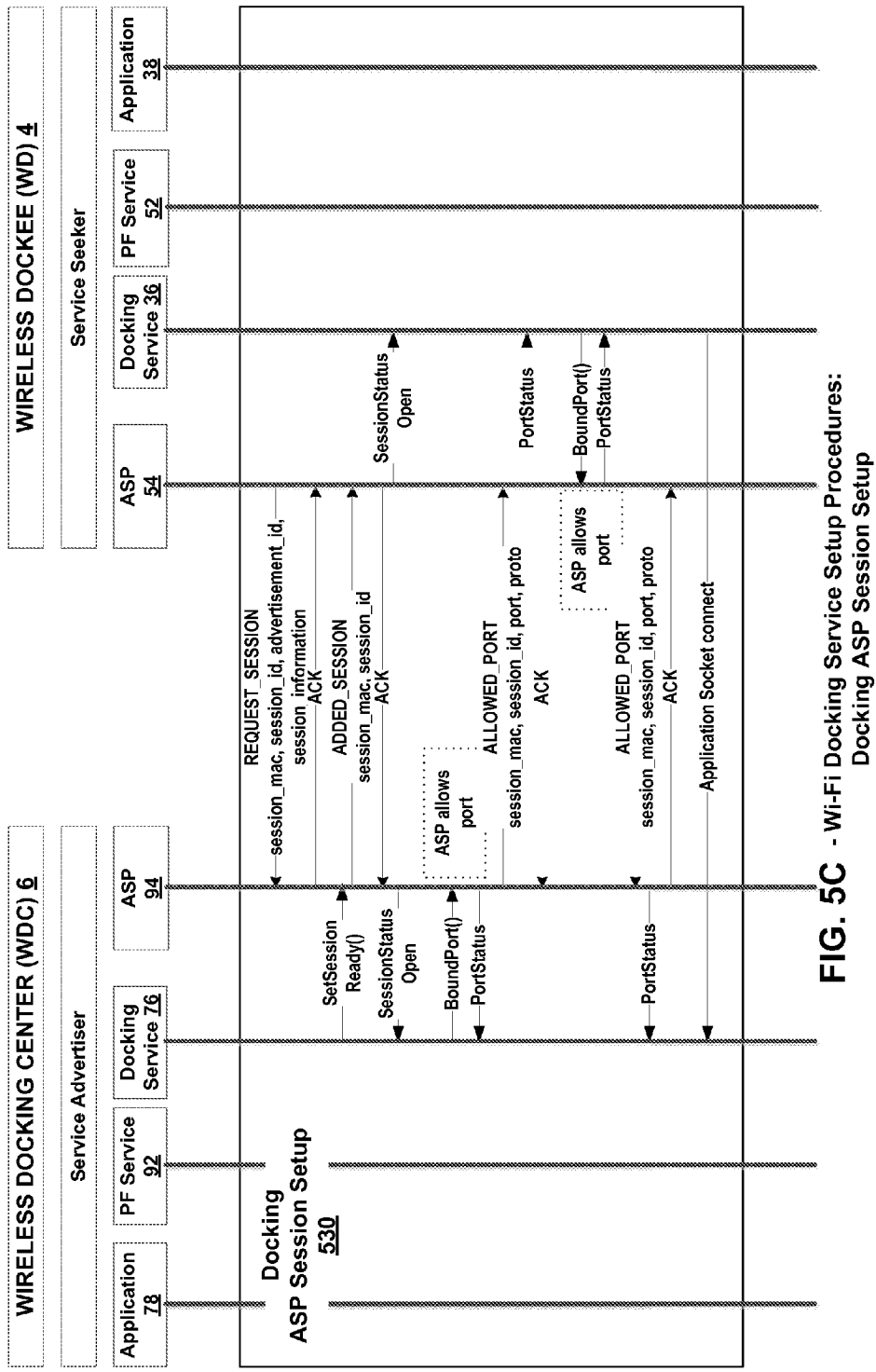
FIG. 5C - Wi-Fi Docking Service Setup Procedures: Docking ASP Session Setup

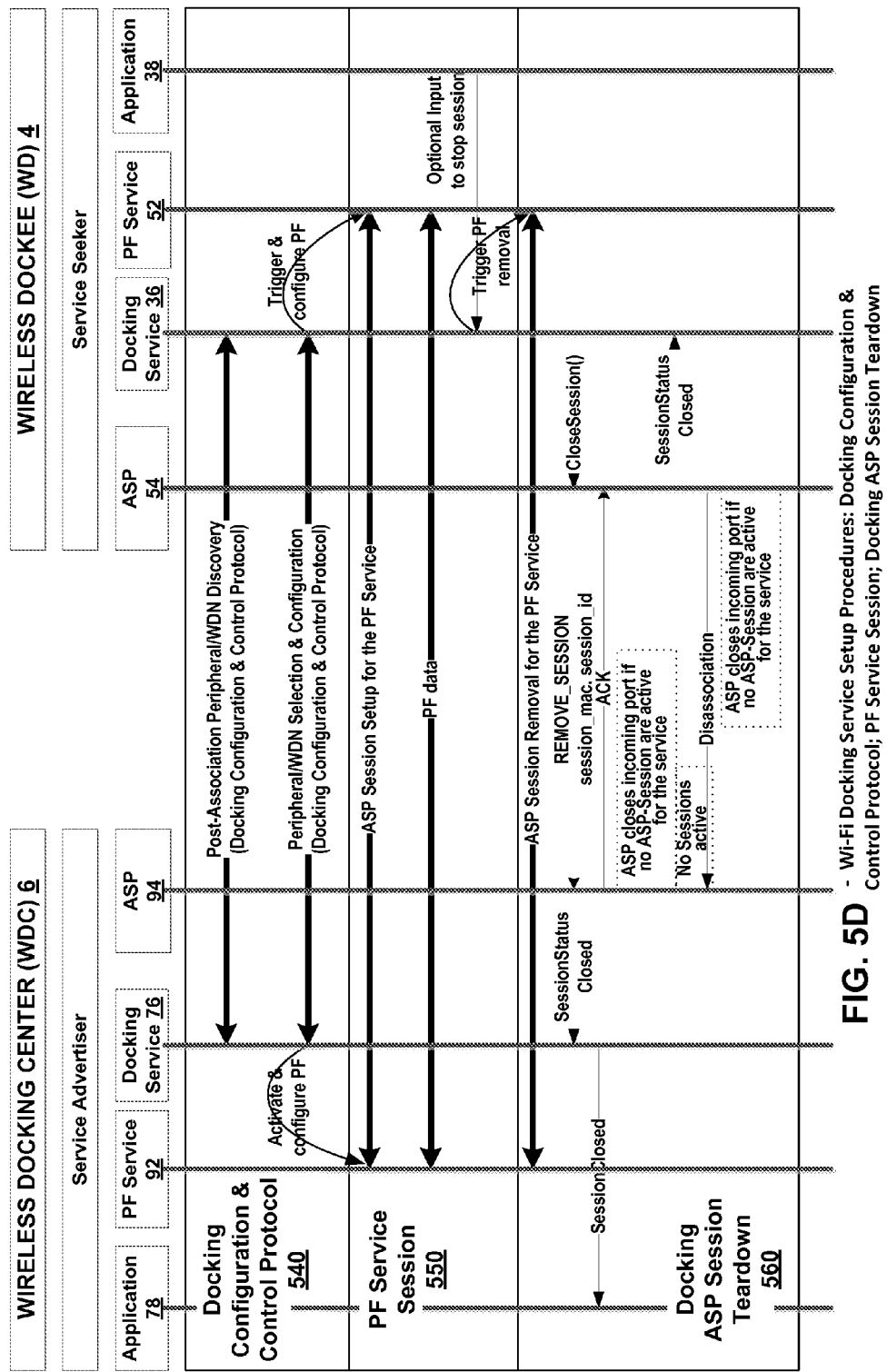
FIG. 5D - Wi-Fi Docking Service Setup Procedures: Docking Configuration & Control Protocol; PF Service Session; Docking ASP Session Teardown

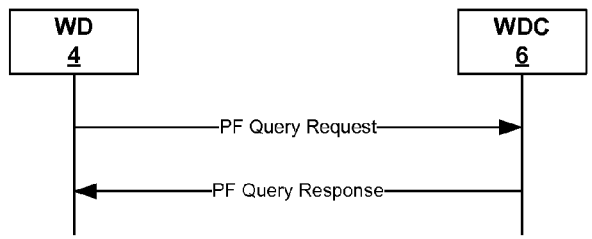
FIG. 6A - PF Query Procedure
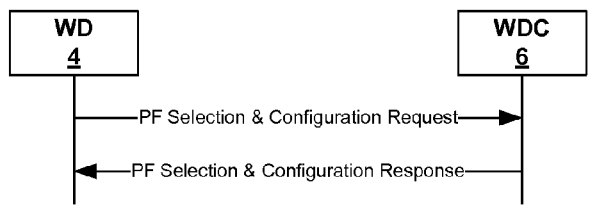
FIG. 6B - PF Selection & Configuration Procedure
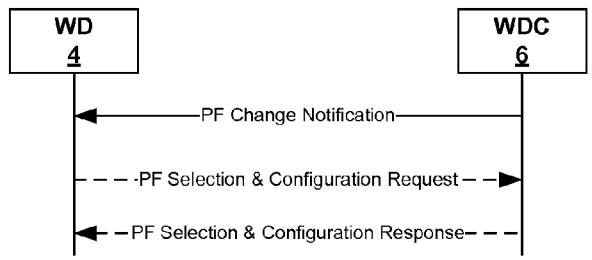
FIG. 6C - PF Change Notification Procedure

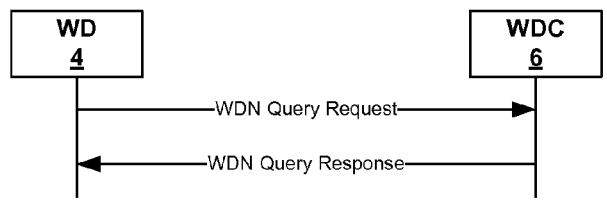
FIG. 6D - WDN Query Procedure
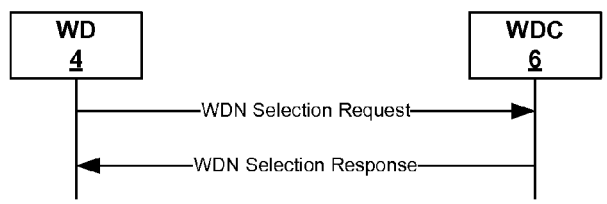
FIG. 6E - WDN Selection Procedure
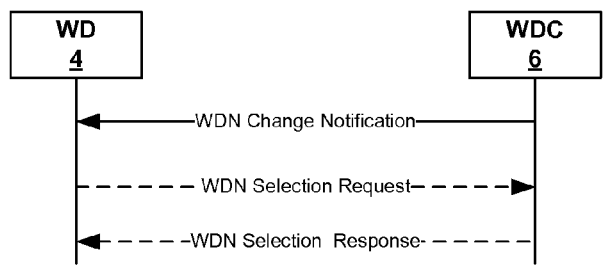
FIG. 6F - WDN Change Notification Procedure
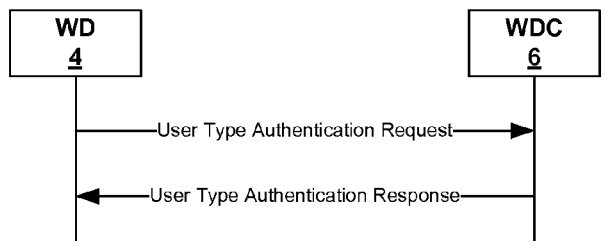
FIG. 6G - User Type Authentication Procedure

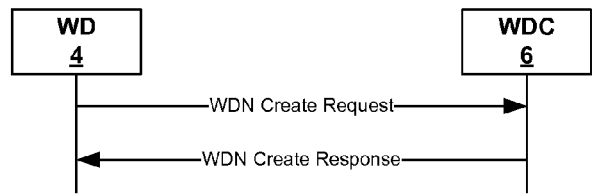
FIG. 6H - WD-Centric WDN Create Procedure
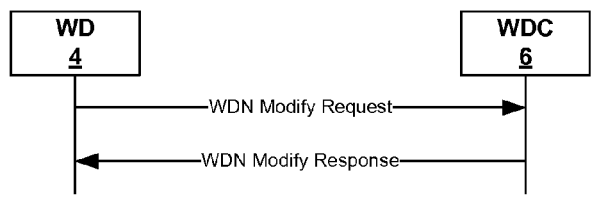
FIG. 6I - WD-Centric WDN Modify Procedure
FIG. 6J - WD-Triggered WDN Delete Procedure
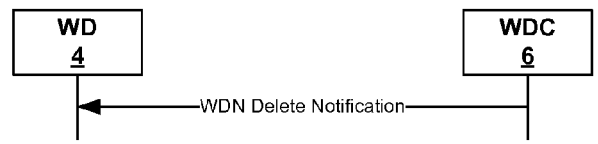
FIG. 6K - WDC-Triggered WDN Delete Procedure

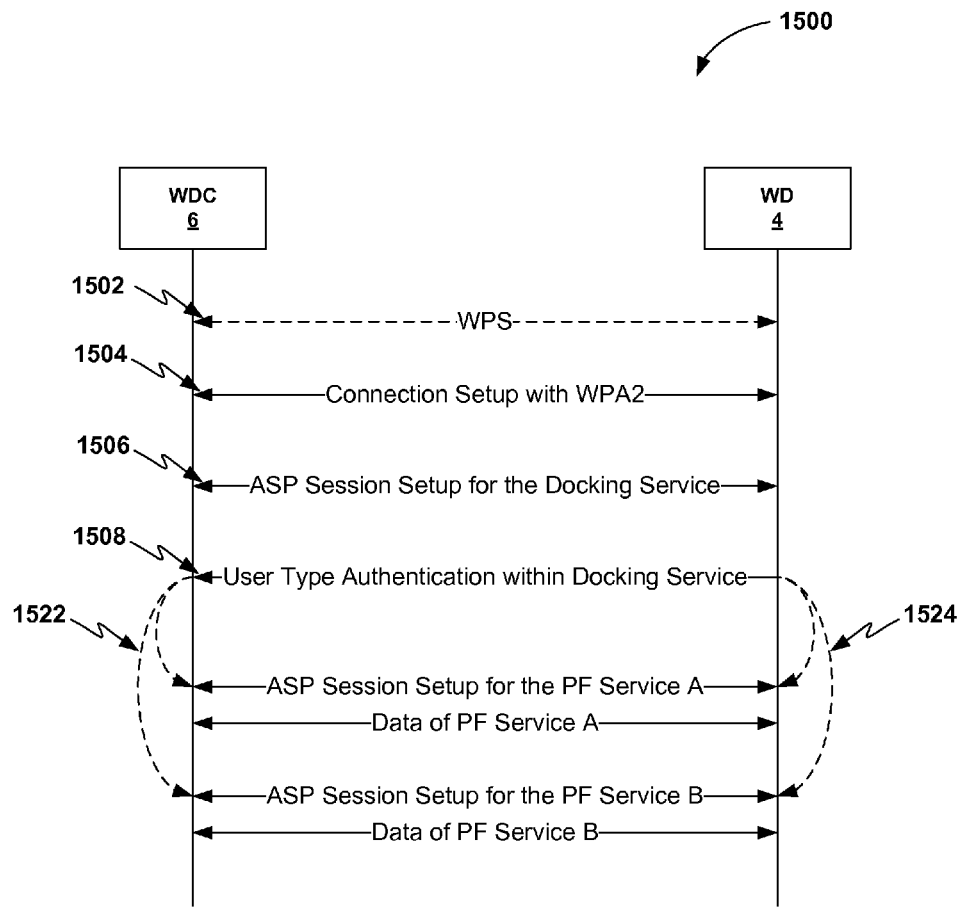
FIG. 7 - Example PF Services Setup

FIG. 9 - Wi-Fi Docking Architecture

ACCESS CONTROL FOR WIRELESS DOCKING

This application claims the benefit of U.S. Provisional Application No. 61/827,475, filed May 24, 2013, the entire content of which is incorporated herein by reference.

TECHNICAL FIELD

This disclosure relates to techniques for wireless docking between electronic devices.

BACKGROUND

Docking stations, which may also be referred to as "docks," are sometimes used to couple electronic devices such as laptop computers to peripherals such as monitors, keyboards, mice, printers, or other types of input or output devices. These docking stations require a connection between the electronic device and the docking station. Additionally, the electronic device and the docking station must first establish docking communications before docking functions may be used.

SUMMARY

In some examples, this disclosure describes techniques for a wireless docking system environment in which a wireless dockee device is enabled to configure peripheral functions, configure and store a wireless docking environment, and/or perform other wireless docking functions.

In one example, a method includes receiving, by a wireless docking center (WDC) and from a wireless dockee (WD), a request to access one or more peripheral functions (PFs) associated with the WDC, and receiving, by the WDC and from the WD, one or more authentication credentials. In this example, the method also includes determining, by the WDC, whether or not the one or more authentication credentials received from the WD grant access to the one or more PFs to which the WD requests access, and, in response to determining that the one or more authentication credentials grant access to a first PF of the one or more PFs to which the WD requests access, permitting, by the WDC, the WD to access the first PF.

In another example, a WDC includes a memory, one or more processors, and at least one module executable by the one or more processors. In this example, the at least one module is executable by the one or more processors to receive, from a WD, a request to access one or more PFs associated with the WDC, and receive, from the WD, one or more authentication credentials. In this example, the at least one module is also executable by the one or more processors to determine whether or not the one or more authentication credentials received from the WD grant access to the one or more PFs to which the WD requests access, and, in response to determining that the one or more authentication credentials grant access to a first PF of the one or more PFs to which the WD requests access, permitting, by the WDC, the WD to access the first PF.

In another example, a WDC includes means for receiving, from a WD, a request to access one or more PFs associated with the WDC, and means for receiving, from the WD, one or more authentication credentials. In this example, the WDC also includes means for determining whether or not the one or more authentication credentials received from the WD grant access to the one or more PFs to which the WD requests access, and means for permitting the WD to access a first PF of the one of the one or more PFs to which the WD requests access in response to determining that the one or more authentication credentials grant access to the first PF.

In another example, a non-transitory computer-readable storage medium stores instructions that, when executed, cause one or more processors of a WDC to receive, from a WD, a request to access one or more PFs associated with the WDC, and receive, from the WD, one or more authentication credentials. In this example, the non-transitory computer-readable storage medium also stores instructions that, when executed, cause one or more processors of the WDC to determine whether or not the one or more authentication credentials received from the WD grant access to the one or more PFs to which the WD requests access, and, in response to determining that the one or more authentication credentials grant access to a first PF of the one or more PFs to which the WD requests access, permit, by the WDC, the WD to access the first PF.

In one example, a method includes sending, by a WD and to a WDC, a request to access one or more PFs associated with the WDC, and sending, by the WD and to the WDC, one or more authentication credentials. In this example, the method also includes determining, by the WD, whether or not the one or more authentication credentials sent to the WDC grant access to the one or more PFs to which the WD requests access, and, in response to determining that the one or more authentication credentials grant access to a first PF of the one or more PFs to which the WD requests access, accessing, by the WD, the first PF.

In another example, a WD includes a memory, one or more processors, and at least one module executable by the one or more processors. In this example, the at least one module is executable by the one or more processors to send, to a WDC, a request to access one or more PFs associated with the WDC, and send, to the WDC, one or more authentication credentials. In this example, the at least one module is also executable by the one or more processors to determine whether or not the one or more authentication credentials sent to the WDC grant access to the one or more PFs to which the WD requests access, and, in response to determining that the one or more authentication credentials grant access to a first PF of the one or more PFs to which the WD requests access, accessing, by the WD, the first PF.

In another example, a WD includes means for sending, to a WDC, a request to access one or more PFs associated with the WDC, and means for sending, by the WD and to the WDC, one or more authentication credentials. In this example, the WD also includes means for determining, by the WD, whether or not the one or more authentication credentials sent to the WDC grant access to the one or more PFs to which the WD requests access, and, means for accessing a first PF of the one or more PFs to which the WD requests access in response to determining that the one or more authentication credentials grant access to the first PF.

In another example, a non-transitory computer-readable storage medium stores instructions that, when executed, cause one or more processors of a WD to send, to a WDC, a request to access one or more PFs associated with the WDC, and send, to the WDC, one or more authentication credentials. In this example, the non-transitory computer-readable storage medium also stores instructions that, when executed, cause one or more processors of the WD to determine whether or not the one or more authentication credentials sent to the WDC grant access to the one or more PFs to which the WD requests access, and, in response to determining that the one or more authentication credentials grant access to a first PF of the one or more PFs to which the WD requests access, access the first PF.

The details of one or more examples are set forth in the accompanying drawings and the description below. Other features, objects, and advantages will be apparent from the description and drawings, and from the claims.

BRIEF DESCRIPTION OF DRAWINGS

FIG. 2 is a communication flow diagram illustrating an example data flow between a WD and a WDC performing techniques to wirelessly dock such that the WD may access one or more PFs associated with the WDC, in accordance with one or more examples of this disclosure.

FIG. 3 is a communication flow diagram illustrating an example data flow between a WD and a WDC performing techniques to wirelessly dock such that the WD may create and access one or more WDNs associated with the WDC, in accordance with one or more examples of this disclosure.

FIGS. 5A-5D are communication flow diagrams that each illustrate one or more portions of the example data flow of FIG. 5 during various phases of the example wireless docking procedure, in accordance with one or more examples of this disclosure.

FIGS. 6A-6K are communication flow diagrams illustrating example data flows between a WD and a WDC performing various wireless docking techniques, in accordance with one or more examples of this disclosure.

FIG. 7 is a communication flow diagram illustrating an example data flow between a WD and a WDC performing techniques to wirelessly dock, in accordance with one or more examples of this disclosure.

DETAILED DESCRIPTION

Figure 1:
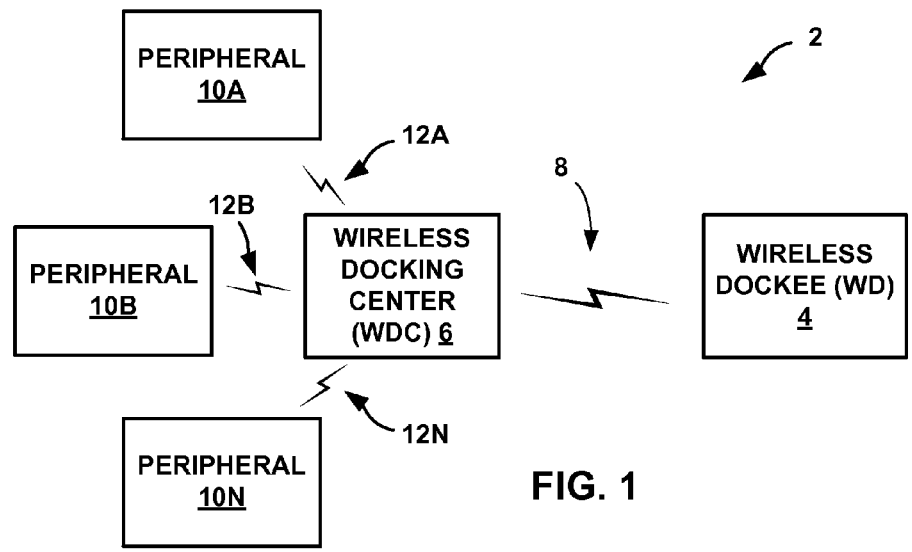
FIG. 1 is a conceptual diagram of an example wireless docking environment (WDE) in which a wireless dockee (WD) is configured to wirelessly dock with a wireless docking center (WDC) over a wireless communication channel in order to utilize one or more peripherals (PFs) associated with the WDC, in accordance with one or more techniques of this disclosure.

This disclosure describes wireless communication techniques, protocols, methods, and devices applicable to a docking system environment in which a wireless dockee (WD), such as a mobile device, may dock wirelessly with a wireless docking center (WDC), also known as a docking host or docking station. The WD and WDC may establish a docking session with each other. The WDC may enable interaction between the WD and any number of peripheral devices (PF) that are associated with the WDC. For example, the peripherals may include displays, projectors, speakers, keyboards, mice, joysticks, data storage devices, network interface devices, other docking hosts, remote controls, cameras, microphones, printers, or other devices. Such peripheral devices may include stand-alone devices or components of devices such as other computers, in different examples. A user may wirelessly dock a WD, such as a mobile handset, with a WDC, and enable interaction between the WD and any of the peripherals. The WD may be enabled to control aspects of the docking session, and to store certain information from one docking session to use in future docking sessions, obviating the need to repeat exchanges of the same information to set up future docking sessions, in some examples.

In general, wireless docking may be comprised of four components: discovery, connection setup, session setup, and configuration and control protocol. Discovery may enable a WD to identify a WDC and its service attributes. After initial discovery, the WD may connect to the WDC by setting up a new ASP session for the docking service. After the session setup, the configuration and control protocol may enable the WD to negotiate and configure its own use of PFs at the WDC. Subsequently, the WDC may enable the access to the PF services for the WD by establishing payload connections for individual PF services with the WD.

In some examples, a WD may wirelessly dock with a WDC by selecting one or more of the PFs associated with the WDC. For instance, WD 4 may individually select a display PF and a keyboard PF. In some examples, as opposed to selecting individual PFs, a WD may select one or more wireless docking environments (WDNs) that each correspond to one or more of the PFs associated with the WDC. In some examples, WDNs may be either WD-Centric or WDN-Centric. A WD-Centric WDN is a WDN that is defined (e.g., created) by a WD for use by the WD. Configuration data for WD-Centric WDNs may be stored at WDC, at a WD, or both. A WDC-Centric WDN is a WDN that is available for general use (e.g., by a plurality of WDs). In some examples, a WDN may be a particular type of WDN. Some example WDN types include, but are not limited to, an office WDN type, an entertainment WDN type, a public workplace WDN type, an audio only WDN type, and an enterprise office WDN type. In some examples, an office WDN type may be associated with a display PF, a mouse PF, and a keyboard PF. In some examples, an audio only WDN type may be associated with an audio sink PF (e.g., speakers).

FIG. 1 is a conceptual diagram of an example wireless docking environment (WDE) in which a wireless dockee (WD) is configured to wirelessly dock with a wireless docking center (WDC) over a wireless communication channel in order to utilize one or more peripherals associated with the WDC, in accordance with one or more techniques of this disclosure. As illustrated in FIG. 1, WDE 2 includes WD 4, WDC 6, wireless communication channel 8, peripherals (PF) 10A-10N (collectively "PFs 10"), and communication channels 12A-12N (collectively "communication channels 12").

WDE 2 may include WD 4 which may be configured to wirelessly dock with a WDC over a wireless communication channel in order to access one or more PFs associated with the WDC. For instance, WD 4 may wirelessly dock with WDC 6 over wireless communication channel 8 in order to access one or more of PFs 10. Examples of WD 4 may include, but are not limited to mobile devices such as smartphones or other mobile handsets, tablet computers, laptop computers, one or more processing units or other integrated circuits or chip sets, or other electronic device.

Wireless communication channel 8 may be any channel capable of propagating communicative signals between WD 4 and WDC 6. In some examples, wireless communication channel 8 may be implemented in radio frequency communications in frequency bands such as the 2.4 gigahertz (GHz) band, the 5 GHz band, the 60 GHz band, or other frequency bands. In some examples, wireless communication channel 8 may comply with one or more sets of standards, protocols, or technologies among Wi-Fi (as promoted by the Wi-Fi Alliance), WiGig (as promoted by the Wireless Gigabit Alliance), and/or the Institute of Electrical and Electronics Engineers (IEEE) 802.11 set of standards (e.g., 802.11, 802.11a, 802.11b, 802.11g, 802.11n, 802.11ac, 802.11ad, etc.), or other standards, protocols, or technologies. The frequency bands used, such as the 2.4 GHz, 5 GHz, and 60 GHz bands, may be defined for purposes of this disclosure as they are understood in light of the standards of Wi-Fi, WiGig, any one or more IEEE 802.11 protocols, or other applicable standards or protocols.

WDE 2 may include WDC 6 which may be configured to operate as a wireless docking host device for a WD in order to facilitate the WD's utilization of one or more PFs associated with WDC 6. In other words, WDC 4 may be a wireless docking host device that serves as a connectivity agent within a computing and/or communication environment. For instance, WDC 6 may wirelessly dock with WD 4 over wireless communication channel 8 in order to facilitate WD 4's utilization of one or more of peripherals 10. WDC 6 may be a dedicated wireless dock, or may also be implemented in a smartphone or other mobile handset, a tablet computer, a laptop computer, a computer monitor, or other electronic device, or as a component or subsystem of any of the above.

In some examples, WDC 6 may be associated with one or more of PFs 10. As one example, a PF of PFs 10 may be associated with WDC 6 where the PF is managed by WDC 6. A PF may be considered to be managed by WDC 6 where WDC 6 is able to facilitate a WD's utilization of the PF. As another example, a PF of PFs 10 may be associated with WDC 6 where the PF is communicatively coupled to WDC 6, such as by a respective communication channel of communication channels 12.

WDE 2 may include one or more PFs 10 which may be associated with a WDC and may each be configured to provide one or more services to a WD that is wirelessly docked with the associated WDC. For instance, where a PF of PFs 10 is associated with WDC 6 and WD 4 is wirelessly docked with WDC 6, the PF may provide one or more services to WD 4. Examples of PFs 10 may include, but are not limited to, displays, projectors, speakers, keyboards, mice, joysticks, data storage devices, network interface devices, other docking hosts, remote controls, cameras, microphones, printers, or any of various other devices capable of providing a service.

In some examples, one or more of PFs 10 may be communicatively coupled to WDC 6, such as by a respective communication channel of communication channels 12. For instance, PF 10A may be communicatively coupled to WDC 6 via communication channel 12A. In some examples, one or more of communication channels 12 may be wired communication channels. For instance, one or more of communication channels 12 may include a universal serial bus (USB) cable, a network cable, a fiber optic cable, and/or any other cable capable of communicating information. In some examples, one or more of communication channels 12 may be wireless communication channels. For instance, one or more of communication channels 12 may include a Bluetooth link, a Wi-Fi link (which may be similar to wireless communication channel 8), an optical link, and the like. In some examples, one of more of PFs 10 may be included in WDC 6. For instance, WDC 6 may include a display of PFs 6.

A user of WD 4 may desire to access one or more of PFs 10 associated with WDC 6 without physically connecting WD 4 to WDC 6. For instance, where WD 4 is a mobile computing device with a relatively small touch-sensitive display for receiving user input (e.g., a virtual keyboard) and PFs 10 include a full size monitor (e.g., 20" diagonal) and a full size physical keyboard, the user of WD 4 may desire to utilize the full size monitor and the full size keyboard to interact with WD 4. However, it may not be desirable to require the user to establish a wired connection between WD 4 and the full size monitor and keyboard. In accordance with one or more techniques of this disclosure, WD 4 may wirelessly dock with WDC 6 via wireless communication link 8 in order to access one or more of PFs 10. In this way, techniques of the disclosure may enable the user to access one or more of PFs 10 associated with WDC 6 (i.e., the full size monitor and keyboard) without physically connecting WD 4 to WDC 6.

FIG. 2 is a communication flow diagram illustrating example data flow 200 between a WD and a WDC performing techniques to wirelessly dock such that the WD may access one or more PFs associated with the WDC, in accordance with one or more examples of this disclosure. The techniques of FIG. 2 may be performed by a WD and a WDC, such as WD 4 and WDC 6 illustrated in FIG. 1. For purposes of illustration, the techniques of FIG. 2 are described within the context of WD 4 and WDC 6 of FIG. 1, although computing devices having configurations different than that of WD 4 and WDC 6 may perform the techniques of FIG. 2.

A docking configuration and control protocol may be used by WD 4 to select and configure the PFs of its interests in the Docking session. Before the docking configuration and control protocol operates on individual PFs, WD 4 may perform a user type authentication procedure, if this is required by WDC 6. WDC 6 may indicate such a requirement using the element "is UserTypeAuthRequired" during a pre-association discovery phase.

An example sequence of the docking configuration and control procedures for PFs is shown in FIG. 2. In the example, WD 4 first obtains the PF information using the PF Query procedure. Then if needed, WD 4 selects and configures the PFs of its interests. Upon the completion of the PF selection and configuration, WD 4 and WDC 6 setup the individual PF Services.

In accordance with one or more techniques of this disclosure, WD 4 and WDC 6 may exchange communications to perform a docking session setup procedure (202). For instance, WD 4 and WDC 6 may exchange communications to establish a docking session via a direct wireless connection between WD 4 and WDC 6. Further details of an example docking session setup procedure are provided below with reference to FIG. 5B.

WD 4 and WDC 6 may exchange communications to a perform PF inquiry procedure (204). For instance, WD 4 and WDC 6 may exchange communications such that WD 4 may determine one or more PFs associated with WDC 6. Further details of an example docking inquiry procedure are provided below with reference to FIG. 6A.

WD 4 and WDC 6 may exchange communications to a perform PF selection and configuration procedure (206). For instance, WD 4 and WDC 6 may exchange communications such that WD 4 may select one or more PFs associated with WDC 6. Further details of an example PF selection procedure are provided below with reference to FIG. 6B.

WD 4 and WDC 6 may exchange communications to perform PF a service setup procedure (208). For instance, WD 4 and WDC 6 may exchange communications to setup one or more services associated with the one or more selected PFs on one or both of WD 4 and WDC 6. Further details of an example PF service setup procedure are provided below with reference to FIG. 5D.

WD 4 and WDC 6 may exchange PF data (210). For instance, WD 4 and WDC 6 may exchange communications such that WD 4 may access the one or more selected PFs. In this way, WD 4 may wirelessly dock with WDC 6 such that WD 4 may access the one or more selected PFs associated with WDC 6. Further details of example data that may be exchanged between WD 4 and WDC 6 are provided below with reference to FIG. 5D.

FIG. 3 is a communication flow diagram illustrating example data flow 300 between a WD and a WDC performing techniques to wirelessly dock such that the WD may create and access one or more WDNs associated with the WDC, in accordance with one or more examples of this disclosure. The techniques of FIG. 3 may be performed by a WD and a WDC, such as WD 4 and WDC 6 illustrated in FIG. 1. For purposes of illustration, the techniques of FIG. 3 are described within the context of WD 4 and WDC 6 of FIG. 1, although computing devices having configurations different than that of WD 4 and WDC 6 may perform the techniques of FIG. 3.

A docking configuration and control protocol may be used by WD 4 to select and configure the WDNs of its interests in the Docking session. Before the docking configuration and control protocol operates on WDNs, WD 4 may perform a user type authentication procedure, if this is required by WDC 6. WDC 6 may indicate such a requirement using the element "is UserTypeAuthRequired" during a pre-association discovery phase.

An example sequence of the docking configuration and control protocol operations for WDNs is shown in FIG. 3. In the example, WD 4 first obtains the PF information using the PF Query procedure. Then, WD 4 creates a WDN for its future use. In a future Docking session, WD 4 can directly select its WD-Centric WDN, which includes the selection and configuration of PFs of its interests. Upon the completion of the WDN selection, WD 4 and WDC 6 setup the individual PF Services.

In accordance with one or more techniques of this disclosure, WD 4 and WDC 6 may exchange communications to perform a docking session setup procedure (302). For instance, WD 4 and WDC 6 may exchange communications to establish a docking session via a direct wireless connection between WD 4 and WDC 6. Further details of an example docking session setup procedure are provided below with reference to FIG. 5B.

WD 4 and WDC 6 may exchange communications to a perform PF inquiry procedure (304). For instance, WD 4 and WDC 6 may exchange communications such that WD 4 may determine one or more PFs associated with WDC 6. Further details of an example docking session setup procedure are provided below with reference to FIG. 5B.

WD 4 and WDC 6 may exchange communications to perform a WD-Centric WDN creation procedure (306). For instance, WD 4 and WDC 6 may exchange communications such that WD 4 may create a new WDN that corresponds to one or more PFs associated with WDC 6. Further details of an example WDN creation procedure are provided below with reference to FIG. 6H.

WD 4 and WDC 6 may exchange communications to perform a docking session teardown procedure (308). For instance, WD 4 and WDC 6 may exchange communications to close one or more sessions open between WD 4 and WDC 6. Further details of an example docking session teardown procedure are provided below with reference to FIG. 5D.

At a later time, WD 4 may use the WDN created during the WDN creation procedure. WD 4 and WDC 6 may exchange communications to perform a docking session setup procedure (310). For instance, WD 4 and WDC 6 may exchange communications to establish a docking session via a direct wireless connection between WD 4 and WDC 6. Further details of an example docking session setup procedure are provided below with reference to FIG. 5B.

At a later time, WD 4 and WDC 6 may exchange communications to perform a WDN selection procedure (312). For instance, WD 4 and WDC 6 may exchange communications such that WD 4 may select one or more of the WDNs configured for use on WDC 6. Further details of an example WDN selection procedure are provided below with reference to FIG. 6E.

WD 4 and WDC 6 may exchange communications to perform PF a service setup procedure (314). For instance, WD 4 and WDC 6 may exchange communications to setup one or more services associated with one or more PFs the correspond to the selected WDN on one or both of WD 4 and WDC 6. Further details of an example PF service setup procedure are provided below with reference to FIG. 5D.

WD 4 and WDC 6 may exchange PF data (316). For instance, WD 4 and WDC 6 may exchange communications such that WD 4 may access the one or more PFs that correspond to the selected WDN. In this way, WD 4 may wirelessly dock with WDC 6 such that WD 4 may access a WDN configured for use on WDC 6. Further details of example data that may be exchanged between WD 4 and WDC 6 are provided below with reference to FIG. 5D.

Figure 4:
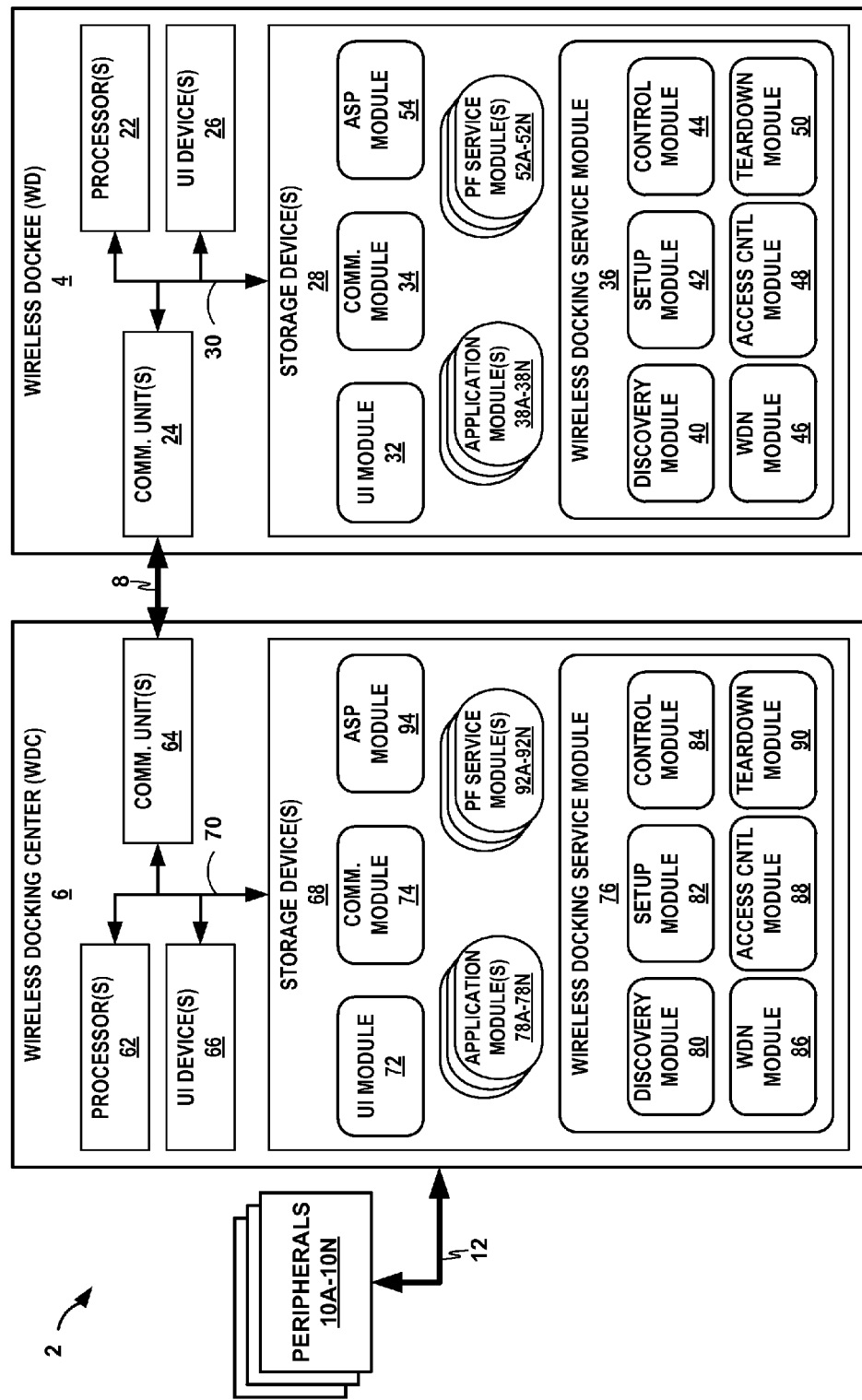
FIG. 4 is a block diagram illustrating further details of one example of the WDE of FIG. 1 in which a WD is configured to wirelessly dock with a WDC over a wireless communication channel in order to utilize one or more PFs associated with the WDC, in accordance with one or more techniques of the present disclosure.

FIG. 4 is a block diagram illustrating further details of one example of WDE 2 in which example WD 4 is configured to wirelessly dock with example WDC 6 over wireless communication channel 8 in order to utilize one or more of PFs 10, in accordance with one or more techniques of the present disclosure.

As illustrated in FIG. 4, WD 4 may include one or more processors 22, one or more communication units 24, one or more user interface (UI) devices 26, and one or more storage devices 28. Each of components 22, 24, 26, and 28 may be interconnected (physically, communicatively, and/or operatively) via communication channels 30 for inter-component communications. In some examples, communication channels 30 may include a system bus, network connection, interprocess communication data structure, or any other channel for communicating data. One or more of storage devices 28, in some examples, may include UI module 32, communication module 34, wireless docking module (WDM) 36, one or more application modules 38A-38N (collectively, "application modules 38"), one or more PF service modules 40A-40N (collectively, "service modules 40"), and application service platform (ASP) module 42.

Processors 22, in one example, are configured to implement functionality and/or process instructions for execution within WD 4. For example, processors 22 may be capable of processing instructions stored in one or more of storage devices 28. Examples of processors 22 may include any one or more microprocessors, digital signal processors (DSPs), application specific integrated circuits (ASICs), field programmable gate arrays (FPGAs), or any other equivalent integrated or discrete logic circuitry, as well as any combinations of such components.

WD 4, in some examples, also includes ones or more communication units 24. WD 4, in one example, utilizes one or more of communication units 24 to communicate with external devices via one or more networks, such as one or more wireless networks. One or more of communication units 24 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, WD 4 utilizes communication unit 24 to wirelessly communicate with an external device. For instance, WD 4 may utilize communication unit 24 to wirelessly communicate with communication unit 64 of WDC 6 over wireless communication channel 8. In some examples, communication unit 24 may receive input from other components of WD 4, such as communication module 34, that causes communication unit 24 to wirelessly communicate with an external device.

WD 4, in some examples, also includes, communication module 34. In some examples, communication module 34 may manage communications between WD 4 and an external device, such as WDC 6. For instance, communication module 34 may connect to a network hosted by WDC 6. In some examples, communication module 34 may exchange data with a WDC. As one example, communication module 34 may receive peripheral data from WDC 6. In some examples, communication module 34 may provide the received information to other components of WD 4. For example, communication module 34 may provide the received peripheral data to one or more of PF service modules 40.

WD 4, in some examples, may also include one or more UI devices 26. In some examples, one or more of UI devices 26 can be configured to output content, such as media data. For instance, one or more of UI devices 26 may be configured to display video data at a display and/or output audio data from speakers. In addition to outputting content, one or more of UI devices 26 may be configured to receive tactile, audio, or visual input. Some examples of UI devices 26 include video displays, speakers, keyboards, touch screens, mice, cameras, and the like.

WD 4, in some examples, may also include UI module 32. UI module 32 can perform one or more functions to receive, content, such as UI data from other components associated with WD 4 and cause one or more of UI devices 26 to output the content. In some examples, UI module 32 may be configured to receive an indication of input, such as user input, and send the indications of the input to other components associated with WD 4, such as WDM 36. Using the data, UI module 32 may cause other components associated with WD 4, such as one or more of UI devices 26, to provide output based on the data.

One or more storage devices 28 may be configured to store information within WD 4 during operation. One or more of storage devices 28, in some examples, may comprise a computer-readable storage medium. In some examples, one or more of storage devices 28 may comprise a temporary memory, meaning that a primary purpose of one or more of storage devices 28 is not long-term storage. One or more of storage devices 28, in some examples, may comprise a volatile memory, meaning that one or more of storage devices 28 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 28 is used to store program instructions for execution by processors 22. One or more of storage devices 28, in one example, may be used by software or modules running on WD 4 (e.g., UI module 32, communication modules 34, WDM 36, PF service modules 40, and ASP module 42) to temporarily store information during program execution.

One or more of storage devices 28, in some examples, may also include one or more computer-readable storage media. One or more of storage devices 28 may further be configured for long-term storage of information. In some examples, one or more of storage devices 28 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Each of application modules 38 may represent an application provided by an entity that manufactures WD 4 or software operating on WD 4 or an application developed by a third-party for use with primary source device 6. Examples of application modules 38 may include applications for travel routing, maps, audio and/or video presentation, streaming video delivery and presentation, word processing, spreadsheets, voice and/or calls, weather, etc.

WD 4, in some examples, may also include ASP module 54 which may be configured to coordinate the discovery of services and manage the connections and sessions between WD 4 and WDC 6. In some examples, ASP module 54 may receive method calls from one or more other components of WD 4, such as WDM 36. In some examples, ASP module 54 may provide event notifications to one or more other components of WD 4, such as WDM 36.

WD 4, in some examples, may also include PF service modules 52 which may be configured to provide a PF service to one or more other components of WD 4, such as one or more of application modules 38. Some example PF services which may be provided by one or more of PF service modules 52 include, but are not limited to, a display service, a Wi-Fi serial bus (WSB) service, a printing service, and an audio service. In some examples, one or more of PF service modules 52 may be configured to exchange PF service session communications, which may include peripheral function data, with a corresponding PF service module of PF service modules 92.

WD 4, in some examples, may also include WDM 36 which may perform one or more functions to wirelessly dock WD 4 with WDC 6, such that WD 4 may access one or more peripheral functions (PFs) associated with WDC 6 (e.g., one or more of PFs 10). In some examples, WDM 36 may include discovery module 40, setup module 42, control module 44, WDN module 46, authentication module 48, and teardown module 50.

WDM 36 may include discovery module 40 which may be configured to perform docking pre-association discovery with WDC 6 to obtain information related to the WDC. For instance, discovery module 40 may determine one or more PFs associated with a WDC. As one example, discovery module 40 may receive the information from the WDC via a wireless link. In some examples, the information may indicate one or more characteristics of the WDC. Some example characteristics which may be indicated by the information include, but are not limited to, a device type that indicates whether the sending device is a WD type device or a WDC type device, a device name that indicates a friendly name of the sending device, a device availability status that indicates whether or not the sending device is available, an indication of one or more PFs associated with the WDC, and one or more docking environment types (e.g., one or more WDNs) stored at WDC 6.

WDM 36 may include setup module 42 which may be configured to setup a wireless docking connection between WD 4 and WDC 6. As one example, setup module 42 may configured to establish a docking session between WDC 6 and WD 4 via a direct wireless connection between WDC 6 and WD 4. In some examples, setup module 42 may be configured to perform docking connection setup exchange between WDC 6 and WD 4. In some examples, setup module 42 may be configured to perform docking ASP (application service platform) session setup between WDC 6 and WD 4.

WDM 36 may include control module 44 which may be configured to manage one or more PFs associated with WDC 6. As one example, control module 44 may exchange docking configuration and control protocol communications with WDC 6. For instance, control module 44 may be configured to select one or more of the PFs associated with WDC 6.

WDM 36 may include WDN module 46 which may be configured to manage the selection/creation/modification/deletion of one or more wireless docking environments (WDNs) that each correspond to one or more PFs. For instance, WDN module 46 may select a WDN by sending a request to select a particular WDN to WDC 6.

WDM 36 may include access control module 48 which may be configured to perform one or more operations to obtain access rights to one or more of PFs 10. For instance, access control module 48 may be configured to perform a user type authentication procedure with WDC 6 by sending user credentials to WDC 6. In some examples, the user credentials may include a user type and a passphrase.

WDM 36 may include teardown module 50 which may be configured to teardown a wireless docking connection between WD 4 and WDC 6. As one example, teardown module 50 may perform docking ASP (application service platform) session teardown between WD 4 and WDC 6. In some examples, teardown module 50 may be configured to perform the teardown procedure in response to not receiving a keep alive signal from WDC 6 in a period of time (e.g., 10 seconds, 30 seconds, 5 minutes).

As illustrated in FIG. 4, WDC 6 may include one or more processors 62, one or more communication units 64, one or more user interface (UI) devices 66, and one or more storage devices 68. Each of components 62, 64, 66, and 68 may be interconnected (physically, communicatively, and/or operatively) via communication channels 70 for inter-component communications. In some examples, communication channels 70 may include a system bus, network connection, interprocess communication data structure, or any other channel for communicating data. One or more of storage devices 68, in some examples, may include UI module 72, communication module 74, wireless docking module (WDM) 76, one or more application modules 78A-78N (collectively, "application modules 78"), one or more PF service modules 80A-80N (collectively, "service modules 80"), and application service platform (ASP) module 82.

Processors 62, in one example, are configured to implement functionality and/or process instructions for execution within WDC 6. For example, processors 62 may be capable of processing instructions stored in one or more of storage devices 68. Examples of processors 62 may include any one or more microprocessors, digital signal processors (DSPs), application specific integrated circuits (ASICs), field programmable gate arrays (FPGAs), or any other equivalent integrated or discrete logic circuitry, as well as any combinations of such components.

WDC 6, in some examples, also includes ones or more communication units 64. WDC 6, in one example, utilizes one or more of communication units 64 to communicate with external devices via one or more networks, such as one or more wireless networks. One or more of communication units 64 may be a network interface card, such as an Ethernet card, an optical transceiver, a radio frequency transceiver, or any other type of device that can send and receive information. Other examples of such network interfaces may include Bluetooth, 3G, and Wi-Fi radios. In some examples, WDC 6 utilizes communication unit 64 to wirelessly communicate with an external device. For instance, WDC 6 may utilize communication unit 64 to wirelessly communicate with communication unit 24 of WD 4 over wireless communication channel 8. In some examples, communication unit 64 may receive input from other components of WDC 6, such as communication module 74, that causes communication unit 64 to wirelessly communicate with an external device.

WDC 6, in some examples, also includes, communication module 74. In some examples, communication module 74 may manage communications between WDC 6 and an external device, such as WD 4. For instance, communication module 74 may connect to a network hosted by WD 4. In some examples, communication module 74 may exchange data with WD 4. As one example, communication module 74 may transmit peripheral data to WD 4. In some examples, communication module 74 may receive the transmitted information to other components of WDC 6. For example, communication module 34 may receive peripheral data from one or more of PF service modules 80.

WDC 6, in some examples, may also include one or more UI devices 66. In some examples, one or more of UI devices 66 can be configured to output content, such as media data. For instance, one or more of UI devices 66 may be configured to display video data at a display and/or output audio data from speakers. In addition to outputting content, one or more of UI devices 66 may be configured to receive tactile, audio, or visual input. Some examples of UI devices 66 include video displays, speakers, keyboards, touch screens, mice, cameras, and the like. In some examples, one or more of UI devices 66 may be included in peripherals 10.

WDC 6, in some examples, may also include UI module 72. UI module 72 can perform one or more functions to receive, content, such as UI data from other components associated with WDC 6 and cause one or more of UI devices 66 to output the content. In some examples, UI module 72 may be configured to receive an indication of input, such as user input, and send the indications of the input to other components associated with WDC 6, such as WDM 76. Using the data, UI module 72 may cause other components associated with WDC 6, such as one or more of UI devices 66, to provide output based on the data.

One or more storage devices 68 may be configured to store information within WDC 6 during operation. One or more of storage devices 68, in some examples, may comprise a computer-readable storage medium. In some examples, one or more of storage devices 68 may comprise a temporary memory, meaning that a primary purpose of one or more of storage devices 68 is not long-term storage. One or more of storage devices 68, in some examples, may comprise a volatile memory, meaning that one or more of storage devices 68 does not maintain stored contents when the system is turned off. Example of volatile memories include random access memories (RAM), dynamic random access memories (DRAM), static random access memories (SRAM), and other forms of volatile memories known in the art. In some examples, one or more of storage devices 68 is used to store program instructions for execution by processors 62. One or more of storage devices 68, in one example, may be used by software or modules running on WDC 6 (e.g., UI module 72, communication modules 74, WDM 76, PF service modules 80, and ASP module 82) to temporarily store information during program execution.

One or more of storage devices 68, in some examples, may also include one or more computer-readable storage media. One or more of storage devices 68 may further be configured for long-term storage of information. In some examples, one or more of storage devices 68 may include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Each of application modules 78 may represent an application provided by an entity that manufactures WDC 6 or software operating on WDC 6 or an application developed by a third-party for use with primary source device 6. Examples of application modules 78 may include applications for travel routing, maps, audio and/or video presentation, streaming video delivery and presentation, word processing, spreadsheets, voice and/or calls, weather, etc.

WDC 6, in some examples, may also include ASP module 82 which may be configured to coordinate the discovery of services and manage the connections and sessions between WDC 6 and WD 4. In some examples, ASP module 82 may receive method calls from one or more other components of WDC 6, such as WDM 76. In some examples, ASP module 82 may provide event notifications to one or more other components of WDC 6, such as WDM 76.

WDC 6, in some examples, may also include PF service modules 92 which may be configured to provide a PF service to a corresponding PF service module of WD 4. Some example PF services which may be provided by one or more of PF service modules 92 include, but are not limited to, a display service, a Wi-Fi serial bus (WSB) service, a printing service, and an audio service. In some examples, one or more of PF service modules 92 may be configured to exchange PF service session communications, which may include peripheral function data, with a corresponding PF service module of PF service modules 52.

WDC 6, in some examples, may also include WDM 76 which may perform one or more functions to wirelessly dock WD 4 with WDC 6, such that WD 4 may access one or more peripheral functions (PFs) associated with WDC 6 (e.g., one or more of PFs 10). In some examples, WDM 76 may include discovery module 80, setup module 82, control module 84, WDN module 86, authentication module 88, and teardown module 90.

WDM 76 may include discovery module 80 which may be configured to perform docking pre-association discovery with WD 4 to provide information related to the WDC. For instance, discovery module 80 may provide information related to one or more PFs associated with WDC 6 to discovery module 40 of WD 4. In some examples, discovery module 80 may provide the information to WD 4 via a wireless link. In some examples, the information may indicate one or more characteristics of WDC 6. Some example characteristics which may be indicated by the information include, but are not limited to, a device type that indicates whether WDC 6 is a WD type device or a WDC type device, a device name that indicates a friendly name of WDC 6, a device availability status that indicates whether or not WDC 6 is available, an indication of one or more PFs associated with WDC 6, and one or more docking environment types (e.g., one or more WDNs) stored at WDC 6.

WDM 76 may include setup module 82 which may be configured to setup a wireless docking connection between WDC 6 and WD 4. As one example, setup module 82 may configured to establish a docking session between WDC 6 and WD 4 via a direct wireless connection between WDC 6 and WD 4. In some examples, setup module 82 may be configured to perform docking connection setup exchange between WDC 6 and WD 4. In some examples, setup module 82 may be configured to perform docking ASP (application service platform) session setup between WDC 6 and WD 4.

WDM 76 may include control module 84 which may be configured to manage one or more PFs associated with WD 6. As one example, control module 84 may exchange docking configuration and control protocol communications with WD 4. For instance, control module 84 may be configured to process a request to select one or more of the PFs associated with WDC 6 received from WD 4.

WDM 76 may include WDN module 86 which may be configured to manage the selection/creation/modification/deletion of one or more wireless docking environments (WDNs) that each correspond to one or more PFs. For instance, WDN module 76 may create a new WDN responsive to receiving a request to create the new WDN from WD 4.

WDM 76 may include access control module 88 which may be configured to perform one or more operations to obtain access rights to one or more of PFs 10. For instance, access control module 88 may be configured to perform a user type authentication procedure with WD 4 by receiving user credentials from WD 4. In some examples, the user credentials may include a user type and a passphrase.

WDM 76 may include teardown module 90 which may be configured to teardown a wireless docking connection between WDC 6 and WD 4. As one example, teardown module 90 may perform docking ASP (application service platform) session teardown between WDC 6 and WD 4. In some examples, teardown module 90 may be configured to perform the teardown procedure in response to not receiving a keep alive signal from WD 4 in a period of time (e.g., 10 seconds, 30 seconds, 5 minutes).

Figure 5:
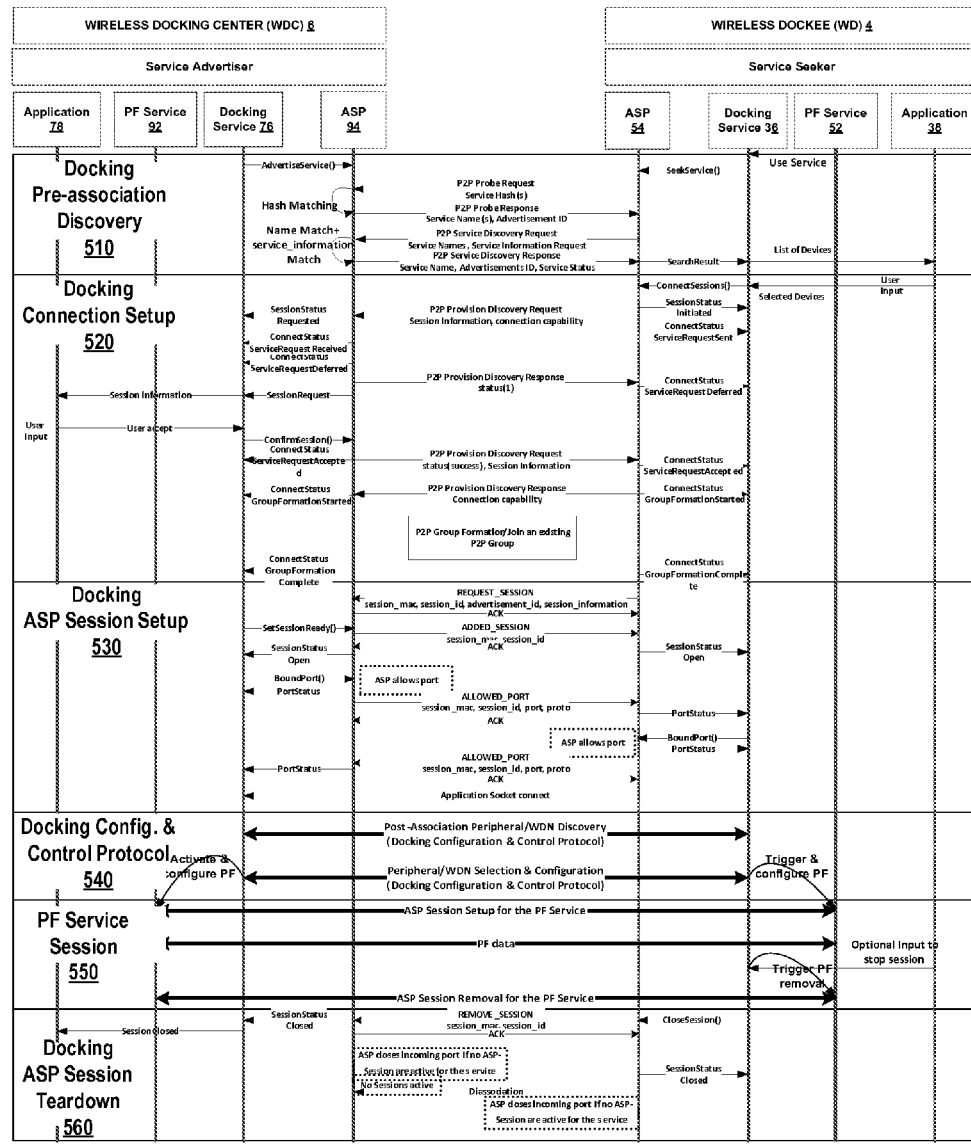
FIG. 5 is a communication flow diagram illustrating an example data flow between a WD and a WDC performing techniques to wirelessly dock, in accordance with one or more examples of this disclosure.

FIG. 5 is a communication flow diagram illustrating an example data flow between a WD and a WDC performing techniques to wirelessly dock, in accordance with one or more examples of this disclosure. The techniques of FIG. 5 may be performed by a WD and a WDC, such as WD 4 and WDC 6 illustrated in FIG. 1 and FIG. 4. For purposes of illustration, the techniques of FIG. 5 are described within the context of WD 4 and WDC 6 of FIG. 1 and FIG. 4, although computing devices having configurations different than that of WD 4 and WDC 6 may perform the techniques of FIG. 5. FIGS. 5A-5D each illustrate one or more portions of the example data flow of FIG. 5 during various phases of an example wireless docking procedure. Specifically, FIG. 5A illustrates docking pre-association discovery, FIG. 5B illustrates connection setup, FIG. 5C illustrates ASP session setup, and FIG. 5D illustrates configuration and control, PF service session, and teardown.

A user of WD 4 may desire to access one or more of PFs 10 associated with WDC 6 without physically connecting WD 4 to WDC 6. For instance, where WD 4 is a mobile computing device with a relatively small touch-sensitive display for receiving user input (e.g., a virtual keyboard) and PFs 10 include a full size monitor (e.g., 20" diagonal) and a full size physical keyboard, the user of WD 4 may desire to utilize the full size monitor and the full size keyboard to interact with WD 4. However, it may not be desirable to require the user to establish a wired connection between WD 4 and the full size monitor and keyboard. In accordance with one or more techniques of this disclosure, WD 4 may wirelessly dock with WDC 6 via wireless communication link 8 in order to access one or more of PFs 10. In this way, techniques of the disclosure may enable the user to access one or more of PFs 10 associated with WDC 6 (i.e., the full size monitor and keyboard) without physically connecting WD 4 to WDC 6.

As illustrated in FIG. 5, the docking services (i.e., WDM 36 and WDM 76) may use the ASP to perform the pre-association device and service discovery (510). If the docking service provided by WDC 6 matches the interests of WD 6, the docking service on WDC 6 and the docking service on WD 4 may use the ASP to perform a P2P provision discovery procedure and subsequently form a P2P group that includes WDC 6 and the WD 4 (520). An ASP Session may then be created for the Docking session between WDC 6 and WD 4 (530).

Once the ASP session for the docking services is set up, a docking configuration and control protocol may run over the connection of the docking ASP session (540). The docking configuration and control protocol may be used for post-association PF/WDN discovery, PF/WDN selection and configuration for PF Services. In some examples, before the PF/WDN selection and configuration is completed, the Docking Service may block WD's access to all its PF services.

Upon the completion of the PF/WDN selection and configuration, the docking service at WDC 6 may allow WD 4 to access those services that WDC 6 has agreed to offer (550). WD 4 and WDC 6 may perform a PF service setup procedure. The PF service setup procedure may in turn include potential PF connection setup, and PF ASP Session setup.

WD 4 may undock from WDC 6. For instance, a docking session teardown procedure may be triggered which may cause the docking services to close the ASP session of each individual PF Service between WDC 6 and WD 4.

As illustrated in FIG. 5A, during docking pre-association discovery phase 510, WD 4 may perform docking pre-association discovery to determine one or more PFs associated with WDC 6. For instance, discovery module 80 may advertise a wireless docking service of WDC 6 (e.g., WDM 76) such that the wireless docking service can be discovered by one or more WDs. In some examples, discovery module 80 may advertise the wireless docking service by causing ASP module 94 to perform an AdvertiseService method. Discovery module 80 may cause ASP module 94 to perform the AdvertiseService method by specifying one or more of the following parameters: a service name value, an auto-accept value, a service information value, and/or a service status value. In some examples, a primitive for the AdvertiseService method may be: AdvertiseService(service_name, auto_accept, service_information, service_status). In some examples, discovery module 80 may specify the service name value as org.wi-fi.wfds.docking.wdc. In some examples, discovery module 80 may specify the service information value as including information regarding one or more of PFs 10 and/or one or more WDNs currently configured at WDC 6. In some examples, discovery module 80 may specify the service information value as identifying a docking environment type (DET), such as by using a wdnType element as described below. In some examples, discovery module 80 may specify the service information value as a UTF-8 text string of XML data that may include the element preassociationServiceDiscovery. An example preassociationServiceDiscovery element which may be defined as provided in the XML schema below.

In some examples, WDC 6 may perform pre-association discovery by sending a message to WD 4 that indicates that WDC 6 is hosting a wireless docking service. In some examples, the message further indicates whether or not WDC 6 requests performance of a user type authentication procedure. In some examples, discovery module 80 may cause ASP module 94 to send the message by calling the AdvertiseService method. In some examples, ASP module 94 may perform the AdvertiseService method by waiting to receive, from WD 4, a request querying whether or not WDC 6 is hosting a wireless docking service.

Discovery module 40 of WD 4 may perform docking pre-association discovery. For instance, discovery module 40 may seek a wireless docking service. In some examples, discovery module 40 may seek the wireless docking service by causing ASP module 54 to perform a SeekService method. Discovery module 40 may cause ASP module 54 to perform the SeekService method by specifying one or more of the following parameters: a service name value, an exact search value, a MAC address value, and/or a service information request value. In some examples, a primitive for the SeekService method may be SeekService(service_name, exact_search, mac_address, service_information_request). In some examples, discovery module 40 may specify the service name value as org.wi-fi.wfds.docking.wdc. In some examples, discovery module 40 may specify the exact search value as TRUE (or a logical equivalent). In some examples, discovery module 40 may specify the service information request value as NULL (or a logical equivalent). In some examples, discovery module 40 may specify the service information request value as a particular DET.

ASP module 54 may perform the SeekService method by sending a request to WDC 6 that indicates that WD 4 is seeking a wireless docking service. For instance, ASP module 54 may send a P2P probe request to WDC 6 that includes a hash value of the service name value specified by discovery module 40 (e.g., org.wi-fi.wfds.docking.wdc). In some examples, ASP module 54 may send the P2P probe request to WDC 6 via communication unit 24.

ASP module 94 may receive the request indicating that WD 4 is seeking a wireless docking service. For example, ASP module 94 may receive the P2P probe request that includes a hash value of the service name value specified by discovery module 40 (e.g., org.wi-fi.wfds.docking.wdc). ASP module 94 may match the hash value included in the request to a hash value of the service name value specified by discovery module 80 in its AdvertiseService method call. Responsive to determining that the service name value specified by discovery module 80 matches the service name value specified by discovery module 40 (i.e., that the hash values match), ASP module 94 may send a P2P probe response to WD 4 that indicates the service name value specified by discovery module 80 and an advertisement identifier corresponding to the service name value.

ASP module 54 may receive the response indicating that WDC 6 is hosting a wireless docking service. For example, ASP module 54 may receive the P2P probe response that includes the service name value specified by discovery module 80 and the advertisement identifier corresponding to the service name value. ASP module 54 may then send a P2P service discovery request to WDC 6 to request information regarding the PFs associated with the wireless docking service of WDC 6.

ASP module 94 may receive the request for information regarding the PFs associated with the wireless docking service of WDC 6. For example, ASP module 94 may receive the P2P service discovery request. Responsive to receiving the request, ASP module 94 may send a response to WD 4 that includes information regarding the PFs associated with the wireless docking service of WDC 6. For example, ASP module 94 may send a P2P service discovery response to WD 4 that includes the information regarding the PFs associated with the wireless docking service of WDC 6, such as some or all of the information specified by discovery module 80 in the service information value when calling the AdvertiseService method and/or advertisement identifiers for the PFs indicated by the service information. In some examples, the response may include information regarding one or more WDNs configured on WDC 6. In such examples, ASP module 94 may receive the information regarding the one or more WDNs configured on WDC 6 from WDN module 86.

ASP module 54 may receive the response that includes the information regarding the PFs associated with the wireless docking service of WDC 6. For example, ASP module 54 may receive the P2P service discovery response that includes the information regarding the PFs associated with the wireless docking service of WDC 6, such as some or all of the information specified by discovery module 80 in the service information value when calling the AdvertiseService method. In some examples, ASP module 54 may send some or all of the received information to discovery module 40. In other words, ASP module 54 may report the results of the SeekService method to discovery module 40, such as with a SearchResult event. In some examples, the results reported with the SearchResult event may include a MAC address of WDC 6 and an advertisement identifier corresponding to the wireless docking service of WDC 6.

Discovery module 40 may then determine whether or not the docking service hosted by WDC 6 matches the interests of WD 4. For instance, discovery module may determine whether or not one or more of the PFs included in the response from WDC 6 match one or more PFs sought by WD 4. In some examples, discovery module 40 may determine the one or more PFs sought by WD 4 by causing UI module 32 to output a GUI requesting user input to identify the one or more PFs sought by WD 4. In some examples, the GUI may include one of more of the PFs included in the response from WDC 6. In some examples, the GUI may include one or more of the WDNs included in the response from WDC 6. In some examples, discovery module 40 may determine the one or more PFs sought by WD 4 prior to calling the SeekService Method. In any case, responsive to determine that one or more of the PFs included in the response from WDC 6 match one or more of the PFs sought by WD 4, discovery module 40 may send a signal to setup module 42 requesting establishment of a docking session. In this way, discovery module 40 and discovery module 80 may perform pre-association discovery.

As illustrated by FIG. 5B, during docking connection setup phase 520, setup module 42 and setup module 82 may establish a docking session between WD 4 and WDC 6. In some examples, setup module 42 and setup module 82 may establish the docking session via a direct wireless connection between WD 4 and WDC 6. In some examples, setup module 42 and setup module 82 may setup the direct wireless connection between WD 4 and WDC 6 by forming a new P2P group that includes both WD 4 and WDC 6. In some examples, as opposed to creating a new P2P group, setup module 42 and setup module 82 may cause WD 4 and WDC 6 to join an existing P2P group. In some examples, the P2P group may be a Wi-Fi Direct P2P group. In some examples, WD 4 may be the group owner. In some examples, WDC 6 may be the group owner. In some examples, WD 4 and WDC 6 may perform group owner negotiation.

In some examples, setup module 42 may setup the P2P group by causing ASP module 54 to perform a ConnectSessions method. Setup module 42 may cause ASP module 54 to perform the ConnectSessions method by specifying one or more of the following parameters: a service MAC value, an advertisement identification value, a session information value, and a network role value. In some examples, a primitive for the ConnectSessions method may be: ConnectSessions(List of(service_mac, advertisement_id), session_information, network_role). In some examples, setup module 42 may specify the service MAC value and the advertisement identification value as the as the MAC address and the advertisement identifier corresponding to the wireless docking service of WDC 6. As discussed above, the MAC address and the advertisement identifier corresponding to the wireless docking service of WDC 6 may be reported to WDM 36 from WDC 6 via ASP module 54 in a prior SearchResult event. In some examples, setup module 42 may cause WD 4 to be the group owner by specifying the network role value as 1.

In some examples, ASP module 54 may perform the ConnectSessions method by exchanging one or more messages with ASP module 94 and notifying setup module 42 of one or more events. As one example, ASP module 54 may perform a SessionStatus event to notify setup module 42 that the session has been initiated. In some examples, ASP module 54 may generate a session identifier for the requested session and provide the session identifier to setup module 42. As another example, ASP module 54 may send a P2P provision discovery request message to ASP module 94. In some examples, the P2P provision discovery request message may include the session identifier. In some examples, the P2P provision discovery request message may include an indication of the connection capabilities of WD 4. Some example connection capabilities may include, but are not limited to, whether the requester (i.e., WD 4) can become a group owner of a new group, whether the requester can become a client, whether the requester can create a new group, whether the requester has an existing group that may be joined by the responder (i.e., WDC 6), etc.

ASP module 94 may receive the P2P provision discovery request message and, in response, perform a SessionStatus event to notify setup module 82 that a session has been requested. In some examples, ASP module 94 may perform a ConnectStatus event to notify setup module 82 that a session request has been received from WD 4. In some examples, ASP module 94 may accept the session request without further input, such as where discovery module 80 specified the auto-accept value as TRUE when calling the AdvertiseService method. In some examples, ASP module 94 may seek additional input prior to accepting or denying the session request, such as where discovery module 80 specified the auto-accept value as FALSE when calling the AdvertiseService method.

Where ASP module 94 does not seek additional input, ASP module 94 may notify ASP module 54 that the session request has been accepted. For instance, ASP module 94 may send a P2P provision discovery response to ASP 54 that indicates that the session has been accepted. In some examples, the P2P provision discovery response may include an indication of one of the connection capabilities of WD 4 (e.g., one or more of the example connection capabilities described above) that is compatible with the connection capabilities of WDC 6. ASP module 94 and ASP module 54 may then complete group formation and/or joinder. For instance, where the connection capabilities of WD 4 are such that WD 4 may create and become the owner of a new group and the connection capabilities of WDC 6 are such that WDC 6 may join a new group, ASP module 54 may cause WD 4 to create the new group and ASP module 94 may cause WDC 6 to join the new group created by WD 4. In this way, a P2P group may be established via a direct wireless connection between WD 4 and WDC 6.

Where ASP module 94 seeks additional input, ASP module 94 may exchange information with setup module 82 in order to obtain said additional input. As one example, ASP module 94 may perform a ConnectStatus event to notify setup module 82 that the session request received from WD 4 has been deferred. As another example, ASP module 94 may perform a SessionRequest event to request instruction from setup module 82 as to whether ASP module 94 should accept or reject the session request. Additionally, in some examples, ASP module 94 may notify ASP module 54 that it is seeking additional input. As one example, ASP module 94 may send a P2P provision discovery response message to ASP module 54 that indicates that the session request has not yet been accepted (e.g., a P2P provision discovery response message with status(1)).

Setup module 82 may receive the request for instruction and attempt to solicit user input that indicates whether ASP module 94 should accept or reject the session request. As one example, setup module 82 may cause UI module 72 to output a request for a user of WDC 6 to provide input indicating whether ASP module 94 should accept or reject the session request. For instance, UI module 72 may cause a light of UI devices 66 to blink, a prompt to appear on a display of UI devices 66, and the like. UI module 72 may then receive user input, such as a button press, that indicates that ASP module 94 should accept the session request. Setup module 82 may provide the requested instruction to ASP module 94, such as by calling a ConfirmSession method. Setup module 82 may call the ConfirmSession method by specifying one or more of the following parameters: a session MAC value, a session ID value, and a confirmed value. Setup module 82 may specify the session MAC value as the MAC of WD 4 and the session ID value as the session identifier generated by ASP module 54. Setup module 82 may instruct ASP module 94 to accept the session request by specifying the confirmed value as TRUE. Setup module 82 may instruct ASP module 94 to reject the session request by specifying the confirmed value as FALSE.

ASP module 94 may perform the ConfirmSession method by sending a message, such as a P2P Provision discovery request message, to ASP module 54 that indicates whether or not ASP module 94 accepts the session request. In some examples, the message may also include session information. In some examples, ASP module 94 may perform a ConnectStatus event to notify setup module 82 that the session request has been accepted.

ASP module 54 may receive the message and notify setup module 42 whether or not the session request was accepted. For instance, ASP module 54 may perform a ConnectStatus event to notify setup module 42 whether or not the session request was accepted. Where the message indicates that the session request was accepted, ASP module 54 may begin P2P group formation. For instance, ASP module 54 may send a message, such as a P2P provision discovery response message, to ASP module 94 that includes an indication of one of the connection capabilities of WD 4 (e.g., one or more of the example connection capabilities described above) that is compatible with the connection capabilities of WDC 6. In some examples, ASP module 54 may perform a ConnectStatus event to notify setup module 42 that group formation has started. ASP module 94 and ASP module 54 may then complete group formation and/or joinder. For instance, where the connection capabilities of WD 4 are such that WD 4 may create and become the owner of a new group and the connection capabilities of WDC 6 are such that WDC 6 may join a new group, ASP module 54 may cause WD 4 to create the new group and ASP module 94 may cause WDC 6 to join the new group created by WD 4. When ASP module 54 determines that WD 4 and WDC 6 are both in the same P2P group, ASP module 54 may perform a ConnectStatus event to notify setup module 42 that group formation is complete. Similarly, when ASP module 94 determines that WD 4 and WDC 6 are both in the same P2P group, ASP module 94 may perform a ConnectStatus event to notify setup module 82 that group formation is complete. In this way, a P2P group may be established via a direct wireless connection between WD 4 and WDC 6.

As illustrated by FIG. 5C, during docking ASP session setup phase 530, ASP module 54 and ASP module 94 may setup an ASP session between WDM 36 and WDM 76. In some examples, ASP module 54 and ASP module 94 may setup the ASP session such that session communications are exchanged via the P2P group of which both WD 4 and WDC 6 are members. In some examples, ASP module 54 may perform ASP session setup by sending a message to ASP module 94 that includes a request to create the new ASP session. For instance, ASP module 54 may send a request session message that includes one or more of: a session MAC value, a session ID value, an advertisement ID value, and session information.

ASP module 94 may receive the message and may send a message to ASP module 54 that includes an acknowledgement that the message was received. ASP module 94 to perform a SetSessionReady method in order to change the state of the requested ASP session to open. In some examples, setup module 82 may cause ASP module 94 to perform the SetSessionReady method in response to ASP module 94 performing the SessionStatus event to notify setup module 82 that the session has been requested. In any case, ASP module 94 may send a message to ASP module 54 that indicates whether or not the session has been added. As one example, ASP module 94 may send an added session message to indicate that the session has been added. As one example, ASP module 94 may send a rejected session message to indicate that the session has been rejected. In either case, the message may include the session MAC value and the session ID value.

Where ASP module 94 indicates that the session is open, ASP module 94 may perform a SessionStatus event to notify setup module 82 that ASP session setup is complete and the ASP session is ready for use. As discussed above, when performing the SessionStatus event, ASP module 94 may also indicate the session MAC, and/or the session ID to setup module 82.

Setup module 82 may receive the notification and may instruct ASP module 94 to allow incoming connections on a particular port. For instance, setup module 82 may call ASP module 94 to perform a BoundPort method by specifying one or more of the following parameters: a session MAC value, a session ID value, an IP address, a port value, and a protocol number. In some examples, setup module 82 may specify the session MAC value as the session MAC of the ASP session. In some examples, setup module 82 may specify the session ID value as the session ID of the ASP session. In some examples, setup module 82 may specify the session protocol value as 6 (e.g., TCP).

ASP module 94 may perform one or more operations to allow incoming communications on the particular port. For instance ASP module 94 may perform the BoundPort method by determining whether or not the particular port specified by setup module 82 is allowed. In some examples, ASP module 94 may perform a PortStatus event to notify setup module 82 as to whether or not the particular port is allowed. If the particular port is allowed, ASP module 94 may send a message, such as an allowed port message, to ASP module 54 indicating that communications of the ASP session should be addressed to the particular port. If the particular port is not allowed, setup module 82 may specify another port until an allowable port is determined.

ASP module 54 may receive the message and may perform a PortStatus event to notify setup module 42 that communications of the ASP session should be addressed to the particular port. Responsive to receiving the message from ASP module 94 indicating that the session has been added, ASP module 54 may perform a SessionStatus event to notify setup module 42 that ASP session setup is complete and the ASP session is ready for use. As discussed above, when performing the SessionStatus event, ASP module 54 may also indicate the session MAC, and/or the session ID to setup module 42.

Setup module 42 may receive the notification and may instruct ASP module 54 to allow incoming connections on a particular port. For instance, setup module 42 may call ASP module 54 to perform a BoundPort method by specifying one or more of the following parameters: a session MAC value, a session ID value, an IP address, a port value, and a protocol number. In some examples, setup module 42 may specify the session MAC value as the session MAC of the ASP session. In some examples, setup module 42 may specify the session ID value as the session ID of the ASP session. In some examples, setup module 42 may specify the session protocol value as 6 (e.g., TCP).

ASP module 54 may perform one or more operations to allow incoming communications on the particular port. For instance ASP module 54 may perform the BoundPort method by determining whether or not the particular port specified by setup module 42 is allowed. In some examples, ASP module 54 may perform a PortStatus event to notify setup module 42 as to whether or not the particular port is allowed. If the particular port is allowed, ASP module 54 may send a message, such as an allowed port message, to ASP module 94 indicating that communications of the ASP session should be addressed to the particular port. If the particular port is not allowed, setup module 42 may specify another port until an allowable port is determined. In this way, WDM 36 of WD 4 may establish a docking session with WDM 76 of WDC 6 via a direct wireless connection. As illustrated by FIG. 5C, an application socket may be connected between WDM 36 and WDM 76.

As illustrated by FIG. 5D, during docking configuration and control protocol phase 540, WD 4 and WDC 6 may perform post-association discovery and configuration. For instance, WDM 36 and/or WDM 76 may perform one or more of a PF query procedure, a PF selection and configuration procedure, a PF list change procedure, a WDN query procedure, a WDN selection procedure, a WDN list change procedure, an authentication procedure, a WDN creation procedure, a WDN modification procedure, a WD triggered WDN deletion procedure, and a WDC triggered WDN deletion procedure. Example details of the procedures are discussed below with reference to FIGS. 6A-6K, respectively.

As illustrated by FIG. 5D, during docking PF service session phase 550, WD 4 and WDC 6 may perform session setup for the PF services and exchange PF data. In some examples, WD 4 and/or WDC 6 may perform session setup for the PF services by performing potential PF connection setup and/or PF ASP session setup. In some examples, WD 4 and/or WDC 6 may perform one or more actions to prepare for session setup. As one example, control module 42 may trigger and/or configure one or more of PF service modules 52 that correspond to the one or more PFs and/or the one or more WDNs selected by WD 4 and accepted by WDC 6. For instance, control module 42 may trigger a particular PF service module of PF service modules 52 to use a corresponding PF service module of PF service modules 92. As another example, control module 82 may activate and/or configure one or more of PF service modules 92 that correspond to the one or more PFs and/or the one or more WDNs selected by WD 4 and accepted by WDC 6. For instance, control module 82 may configure a particular PF service module of PF service modules 92 for use by a corresponding PF service module of PF service modules 52.

In some examples, control module 44 may cause ASP module 54 to setup one or more ASP sessions between one or more of PF service modules 52 and one or more of PF service modules 92. In some examples, control module 84 may cause ASP module 94 to setup one or more ASP sessions between one or more PF service modules of PF service modules 52 and one or more corresponding PF service modules of PF service modules 92.

In any case, the one or more PF service modules of PF service modules 52 may begin to exchange PF data with the one or more corresponding PF service modules of PF service modules 92. For instance, a display service module of PF service modules 52 may begin to send display data (e.g., video data) to a corresponding display service module of PF service modules 92 which may cause a corresponding display peripheral of PFs 10 to output the display data. In this way, WD 4 may wirelessly dock with WDC 6. In some examples, WDC assisted direct pairing between a WD and an External Wi-Fi Capable Peripheral may also be used.

As illustrated by FIG. 5D, during docking ASP session teardown phase 560, WD 4 and WDC 6 may perform a session teardown procedure to close one or more open sessions between WD 4 and WDC 6. In some examples, the session teardown procedure may be initiated by WD 4. For instance, teardown module 50 may initiate the teardown procedure. In some examples, the session teardown procedure may be initiated by WDC 6. For instance, teardown module 90 may initiate the teardown procedure. In some examples, WD 4 and/or WDC 6 may perform the session teardown procedure to close a particular session. For instance, where WD 4 no longer seeks to use a particular PF, WD 4 may perform the session teardown procedure to close the particular session (e.g., an ASP session) between a particular PF service module of PF service modules 52 and a corresponding PF service module of PF service modules 92 associated with the particular PF. In some examples, WD 4 and/or WDC 6 may perform the session teardown procedure to close every session between WD 4 and WDC 6. For instance, where WD 4 is undocking from WDC 6, WD 4 may perform the session teardown procedure to close every session between WD 4 and WDC 6.

WD 4 and/or WDC 6 may close a particular session by sending the corresponding device a message requesting closure of the particular session. For instance, teardown module 50 may close a particular session by calling ASP module 54 to perform a CloseSession method. In some examples, teardown module 50 may call ASP module 54 to perform a CloseSession method by specifying one or more of the following parameters: a session MAC value, and a session ID value. In some examples, setup module 42 may specify the session MAC value as the session MAC of the particular session. In some examples, setup module 42 may specify the session ID value as the session ID of the particular session. In some example, ASP module 54 may perform the CloseSession method by sending a remove_session message to ASP module 94 that indicates an identification value that corresponds to the particular session (e.g., the session MAC of the particular session and/or the session ID of the particular session). In some examples, ASP module 54 may notify WDM 76 that the session has been closed by performing SessionStatus event. In some examples, such as where the particular session is the ASP session between WDM 36 and WDM 76, ASP module 54 may send a disassociation message to ASP 94. In some examples, ASP module 54 may determine whether or not any other sessions are active on the port used by the particular session. Where ASP module 54 determines that no other sessions are active, ASP module 94 may close the port.

WDC 6 may receive the message requesting closure of the particular session. For instance, ASP module 94 may receive the remove_session message. In some examples, in response to receiving the remove_session message, ASP module 94 may perform SessionStatus event to notify WDM 76 that the particular session has been closed. In some examples, ASP module 94 may send a message to ASP module 54 to acknowledge receipt of the remove_session message. In some examples, ASP module 94 may determine whether or not any other sessions are active on the port used by the particular session. Where ASP module 94 determines that no other sessions are active, ASP module 94 may close the port. In this way, a session between WD 4 and WDC 6 may be torn down.

FIGS. 6A-6K are communication flow diagrams illustrating example data flows between a WD and a WDC performing various wireless docking techniques, in accordance with one or more examples of this disclosure. The techniques of FIGS. 6A-6K may be performed by a WD and a WDC, such as WD 4 and WDC 6 illustrated in FIG. 1 and FIG. 4. For purposes of illustration, the techniques of FIGS. 6A-6K are described within the context of WD 4 and WDC 6 of FIG. 1 and FIG. 4, although computing devices having configurations different than that of WD 4 and WDC 6 may perform the techniques of FIGS. 6A-6K.

FIG. 6A illustrates an example data flow between WD 4 and WDC 6 during the performance of an example PF query procedure. As illustrated by FIG. 6A, WD 4 may send a PF query request to WDC 6. For instance, control module 44 of WDM 36 of WD 4 may send a message to control module 84 of WDM 76 of WDC 6 that includes a request for information regarding one or more PFs associated with WDC 6 (e.g., one or more of PFs 10). In some examples, the request may include a "pfQueryReq" type XML element which may be defined as provided in the XML schema below.

Responsive to receiving the query request from WD 4, WDC 6 may send a query response. For instance, control module 84 may send a message to control module 44 that includes information regarding the one or more PFs associated with WDC 6. In some examples, the response may include a "pfQueryRsp" type XML element which may be defined as provided in the XML schema below. In some examples, the information may include a list that identifies the one or more PFs associated with WDC 6. In some examples, the list may identify every PF associated with WDC 6. In some examples, the list may identify a subset of the PFs associated with WDC 6, such as the PFs that are currently available for access by a WD.

In some examples, the information may also include attributes and feasible configurations of the one or more PFs associated with WDC 6. In some examples, control module 84 may indicate the one or more PFs associated with WDC 6 and the attributes and the feasible configurations of the one or more PFs associated with WDC 6 by including in the response, a respective XML element for each PF associated with WDC 6. In some examples, each respective XML element may be of type peripheralFunction which may be defined as provided in the XML schema below. In some examples, support of the PF Query procedure may be mandatory on both WD 4 and WDC 6.

FIG. 6B illustrates an example data flow between WD 4 and WDC 6 during the performance of an example PF selection and configuration procedure. As illustrated by FIG. 6B, WD 4 may send a PF selection and configuration request to WDC 6. For instance, control module 44 of WDM 36 of WD 4 may send a message to control module 84 of WDM 76 of WDC 6 that includes a request to use one or more of the PFs associated with WDC 6. In some examples, control module 44 may include a "pfSelectionReq" type XML element in the request which may be defined as provided in the XML schema below. In some examples, control module 44 may individually identify one or more PFs to which WD 4 seeks access (e.g., a set of sought PFs) in the request. For instance, control module 44 may include a "pfSelection" element for each sought PF, and a "selectionStyle" element set to "specific" in the message. In some examples, control module 44 may indicate a desired configuration for each of the sought PFs in the "pfSelection" element. In some examples, control module 44 may indicate selection of a default set of PFs associated with WDC 6 (i.e., in such examples, control module 44 may not individually identify the sought PFs). For instance, control module 44 may include a "selectionStyle" element set to "all" in the message.

Responsive to receiving the selection request from WD 4, WDC 6 may send a selection response. For instance, control module 44 may send a message to control module 84 that indicates whether or not the selection request is accepted. In some examples, the response may include a "pfSelectionRsp" type XML element which may be defined as provided in the XML schema below.

In some examples, WD 4 may desire to de-select one or more PFs associated with WDC 6 that are currently selected by WD 4. In such examples, WD 4 may perform a de-selection procedure. For instance, control module 44 may send a message to control module 84 that includes a request to de-select one or more of the PFs associated with WDC 6 currently selected by WD 4. In some examples, control module 44 may individually identify the one or more PFs to which WD 4 seeks to de-select in the request. For instance, control module 44 may include a "pfSelection" element for each de-selected PF, and a "selectionStyle" element set to "specific" in the message. In some examples, control module 44 may indicate de-selection of all PFs associated currently selected by WD 4. For instance, control module 44 may include a "selectionStyle" element set to "all" in the message. In such examples, control module 44 may cause teardown module 50 to perform a teardown procedure.

In other words, WD 4 may use the PF selection and configuration procedure to select and configure the PFs of its interests, and in some examples, may be performed after WD 4 has obtained the updated PF information. In some examples, support of the PF selection and configuration procedure may be mandatory on both WD 4 and WDC 6. However, in some examples, the procedure may allow WD 4 to not explicitly select or configure PFs individually.

FIG. 6C illustrates an example data flow between WD 4 and WDC 6 during the performance of an example PF list change procedure. In some examples, information regarding the one or more PFs associated with WDC 6 may change. As one example, the information regarding the one or more PFs associated with WDC 6 may change where an additional PF becomes associated with WDC 6 (e.g., an additional PF is plugged in to WDC 6). As another example, the information regarding the one or more PFs associated with WDC 6 may change where a PF associated with WDC 6 becomes available for use (e.g., where another WD has de-selected the PF). In any case, responsive to determining that the information regarding the one or more PFs associated with WDC 6 has changed (i.e., where WDC 6 has updated information regarding the one or more PFs associated with WDC 6), WDC 6 may send a PF change notification to WD 4. In other words, WDC 6 may use PF Change Notification procedure to inform WD 4 of PF changes. For instance, control module 84 may send a message to control module 44 that includes updated information regarding the one or more PFs associated with WDC 6. In some examples, the updated information may include a list of PFs associated with WDC 6 and attributes and feasible configurations of the listed PFs. In some examples, the message may include a "pfChangeNotif" type XML element which may be defined as provided in the XML schema below. As shown in FIG. 6C, WD 4 may, responsive to receiving the PF change notification, perform a PF selection and configuration procedure as described above. In other words, the procedure may trigger WD 4 to perform the PF selection and configuration procedure again. In some examples, support of the PF change notification procedure may be mandatory on both WD 4 and WDC 6.

FIG. 6D illustrates an example data flow between WD 4 and WDC 6 during the performance of an example WDN query procedure. As illustrated by FIG. 6D, WD 4 may send a WDN query request to WDC 6. For instance, WDN module 46 of WDM 36 of WD 4 may send a message to WDN module 86 of WDM 76 of WDC 6 that includes a request for information regarding one or more WDN configured for use on WDC 6. In some examples, the request may include a "wdnQueryReq" type XML element which may be defined as provided in the XML schema below.

Responsive to receiving the query request from WD 4, WDC 6 may send a query response. For instance, WDN module 86 may send a message to WDN module 46 that includes information regarding the one or more WDNs configured for use on WDC 6. In some examples, the response may include a "wdnQueryRsp" type XML element which may be defined as provided in the XML schema below. In some examples, the information may include a list that identifies the one or more WDNs configured for use on WDC 6. In some examples, the list may identify every WDN configured for use on WDC 6. In some examples, the list may identify a subset of the WDNs configured for use on WDC 6, such as the WDNs that are currently available for access by a WD.

In some examples, the information may also include attributes and feasible configurations of the one or more WDNs configured for use on WDC 6. In some examples, WDN module 86 may indicate the one or more WDNs configured for use on WDC 6 and the attributes and the feasible configurations of the one or more WDNs configured for use on WDC 6 by including in the response, a respective XML element for each WDN configured for use on WDC 6. In some examples, each respective XML element may be of type "wdn" which may be defined as provided in the XML schema below.

In other words, WD 4 may use the PF Query procedure to obtain the WDN information. In some examples, support of the WDN Query procedure may be optional on both WD 4 and WDC 6. In some examples, WDC 6 may indicate whether the WDN Query procedure is supported during the pre-association discovery phase.

FIG. 6E illustrates an example data flow between WD 4 and WDC 6 during the performance of an example WDN selection procedure. As illustrated by FIG. 6E, WD 4 may send a WDN selection request to WDC 6. For instance, WDN module 46 of WDM 36 of WD 4 may send a message to WDN module 86 of WDM 76 of WDC 6 that includes a request to use a particular WDN of the one or more WDNs configured for use on WDC 6 to which WD 4 seeks access. In some examples, WDN module 46 may include a "wdnSelectionReq" type XML element in the request which may be defined as provided in the XML schema below. In some examples, WDN module 46 may include an identifier of the particular WDN to which WD 4 seeks access in the message.

Responsive to receiving the selection request from WD 4, WDC 6 may send a selection response. For instance, WDN module 46 may send a message to WDN module 86 that indicates whether or not the selection request is accepted. In some examples, the response may include a "wdnSelectionRsp" type XML element which may be defined as provided in the XML schema below.

In other words, WD 4 may use the WDN Selection procedure to select a pre-configured WDN (e.g., a WDN previously created by WD 4) and/or a WD-Centric WDN. In some examples, WD 4 may perform the WDN selection procedure after WD 4 has obtained the WDN information. In some examples, support of the WDN Selection procedure may be optional on both WD 4 and WDC 6. In some examples, WDC 6 may indicate whether the WDN Selection procedure is supported during the pre-association discovery phase.

In some examples, WD 4 may desire to de-select one or more WDNs configured for use on WDC 6 that are currently selected by WD 4. In such examples, WD 4 may perform a de-selection procedure. For instance, WDN module 46 may send a message to WDN module 86 that includes a request to de-select one or more of the WDNs configured for use on WDC 6 that are currently selected by WD 4. In some examples, WDN module 46 may individually identify the one or more WDNs that WD 4 seeks to de-select in the request. For instance, WDN module 46 may include a "wdnSelection" element for each de-selected WDN, and a "selectionStyle" element set to "specific" in the message. In some examples, WDN module 46 may indicate de-selection of all WDNs currently selected by WD 4. For instance, WDN module 46 may include a "selectionStyle" element set to "all" in the message. In such examples, WDN module 46 may cause teardown module 50 to perform a teardown procedure.

FIG. 6F illustrates an example data flow between WD 4 and WDC 6 during the performance of an example WDN list change procedure. In some examples, information regarding the one or more WDNs configured for use on WDC 6 may change. As one example, the information regarding the one or more WDNs configured for use on WDC 6 may change where one or more of the PFs corresponding to a WDN becomes available for use (e.g., where another WD has de-selected the PF). As another example, the information regarding the one or more WDNs configured for use on WDC 6 may change where a new WDN is defined (e.g., where a WD has created a new WDN). In any case, responsive to determining that the information regarding the one or more WDNs configured for use on WDC 6 has changed (i.e., where WDC 6 has updated information regarding the one or more WDNs configured for use on WDC 6), WDC 6 may send a WDN change notification to WD 4. For instance, WDN module 86 may send a message to WDN module 46 that includes updated information regarding the one or more WDNs configured for use on WDC 6. In some examples, the updated information may include a list of WDNs configured for use on WDC 6 and attributes and feasible configurations of the listed WDNs. In some examples, the message may include a "wdnChangeNotif" type XML element which may be defined as provided in the XML schema below. As shown in FIG. 6F, WD 4 may, responsive to receiving the WDN change notification, perform a WDN selection and configuration procedure as described above.

FIG. 6G illustrates an example data flow between WD 4 and WDC 6 during the performance of an example authentication procedure. As illustrated by FIG. 6G, WD 4 may send a user type authentication request to WDC 6. For instance, access control module 48 of WD 4 may send a message to access control module 88 of WDC 6 that includes one or more credentials corresponding to a user of WD 4. In some examples, the one or more credentials may indicate a user type of the user of WD 4 and/or a passphrase. Some example user types may include, but are not limited to, owner, guest, administrator, child, and parent. In some examples, the message may include a "userTypeAuthReq" type XML element which may be defined as provided in the XML schema below. In such examples, access control module 48 may indicate the user type using the "userType" element and the passphrase using the "passphrase" element.

WDC 6 may receive the user type authentication request and determine one or more rights associated with the information indicated by the request (e.g., the user type and/or the passphrase). As one example, access control module 88 may determine whether the information indicated by the request grants access rights to one or more of PFs 10. Where the user type is administrator, access control module 88 may determine that the information indicated by the request grants access rights to every PF of PFs 10. Where the user type is guest, access control module 88 may determine that the information indicated by the request grants access rights to a subset of PFs 10. As another example, access control module 88 may determine whether the information indicated by the request grants access rights to one or more WDNs configured for use on WDC 6. As another example, access control module 88 may determine whether the information indicated by the request grants rights create new WDNs for use on WDC 6. As another example, access control module 88 may determine whether the information indicated by the request grants rights modify existing WDNs configured for use on WDC 6. As another example, access control module 88 may determine whether the information indicated by the request grants rights delete existing WDNs configured for use on WDC 6. Where the user type is administrator, access control module 88 may determine that the information indicated by the request grants rights to delete any WDN of the one or more WDNs configured for use on WDC 6. Where the user type is guest, access control module 88 may determine that the information indicated by the request does not grant rights to delete any WDN of the one or more WDNs configured for use on WDC 6.

In other words, WD 4 may use the user type authentication procedure to establish its access rights (e.g., to PF Services). In some examples, support of the user type authentication procedure may be optional on both WD 4 and WDC 6. In some examples, WDC 6 may indicate whether the user type authentication is needed during the pre-association discovery phase.

FIG. 6H illustrates an example data flow between WD 4 and WDC 6 during the performance of an example WDN creation procedure. As illustrated by FIG. 6H, WD 4 may send a WDN create request to WDC 6. For instance, WDN module 46 may send a message to WDN module 86 that includes a request to create a new WDN for use on WDC 6. In some examples, the request may include an indication of a set of PFs associated with WDC 6 that WD 4 is requesting to correspond to the new WDN. For instance, WDN module 46 may request that a new WDN be created that corresponds to a particular display PF, a particular audio playback PF, and a particular user input PF. In some examples, WDN module 46 may indicate the set of PFs by individually identifying each PF of the set of PFs. For instance, WDN module 46 may specify, for each respective PF of the set of PFs, an identification value that uniquely identifies the respective PF (e.g., where PF ID2 corresponds to the particular display PF, PF ID 4 corresponds to the particular audio playback PF, and PF ID 7 corresponds to the particular user input PF, WDN module 46 may request that a new WDN be created that corresponds to PF ID2, PF ID 4, and PF ID 7). In some examples, WDN module 46 may indicate the set of PFs by indicating that the set of PFs consists of one or more PFs currently being accessed by WD 4. For instance, where WD 4 is currently accessing the particular display PF, the particular audio playback PF, and the particular user input PF, WDN module 46 may request that a new WDN be created that corresponds to the PFs currently being accessed by WD 4.

In some examples, WDN module 46 may include a "wdnCreateReq" type XML element in the request which may be defined as provided in the XML schema below. In some examples, such as when WDN module 46 requests that a new WDN be created that corresponds an identified set of PFs, WDN module 46 may specify a selectionStyle element of the wdnCreateReq element as specific. In some examples, such as when WDN module 46 requests that a new WDN be created that corresponds to the PFs currently being accessed by WD 4, WDN module 46 may specify the selectionStyle element of the wdnCreateReq element as current.

Responsive to receiving the request from WD 4, WDC 6 may determine whether to accept or reject the request to create the new WDN. As one example, WDN module 86 may determine whether to accept or reject the request to create the new WDN based on whether or not WD 4 is authorized to create new WDNs. As another example, WDN module 86 may determine whether to accept or reject the request to create the new WDN based on whether or not WD 4 is authorized to access the one or more PFs requested to correspond to the new WDN. In any case, WDC 6 may send a response to WD 4 that indicates whether or not the request to create the new WDN was accepted. For instance, WDN module 86 may send a message to WDN module 46 that indicates whether or not the request to create the new WDN was accepted. Where the request to create the new WDN was accepted, WDN module 86 may include identifying information for the new WDN in the message. In some examples, the message may include a "wdnCreateRsp" type XML element which may be defined as provided in the XML schema below. In some examples, such as where another WD is currently docked with WDC 6, WDC 6 may perform a WDN list change procedure, such as the example WDN list change procedure described above with reference to FIG. 4F, to notify the other WD that the new WDN has been created.

In some examples, configuration information for the new WDN may be stored at WD 4, WDC 6, or both. In some examples, support of the WD-Centric WDN creation procedure may be optional on both WD 4 and WDC 6. In some examples, WDC 6 may indicate whether the WD-Centric WDN creation procedure is supported during the pre-association discovery phase.

FIG. 6I illustrates an example data flow between WD 4 and WDC 6 during the performance of an example WDN modification procedure. As illustrated by FIG. 6I, WD 4 may send a WDN modify request to WDC 6. For instance, WDN module 46 may send a message to WDN module 86 that includes a request to modify an existing WDN of the one or more WDNs configured for use on WDC 6. In some examples, the request may include an indication of the existing WDN and a set of PFs associated with WDC 6 to which WD 4 is requesting the existing WDN be modified to correspond. As one example, where the existing WDN corresponds to a particular audio playback PF, and a particular user input PF, WDN module 46 may request that the existing WDN be modified to additionally correspond to a particular display PF. As another example, where the existing WDN corresponds to a particular audio playback PF, and a particular user input PF, WDN module 46 may request that the existing WDN be modified to no longer correspond to the particular user input PF. In some examples, WDN module 46 may include a "wdnModReq" type XML element in the request which may be defined as provided in the XML schema below.

Responsive to receiving the request from WD 4, WDC 6 may determine whether to accept or reject the request to modify the existing WDN. As one example, WDN module 86 may determine whether to accept or reject the request to modify the existing WDN based on whether or not WD 4 is authorized to modify the existing WDN. As another example, WDN module 86 may determine whether to accept or reject the request to modify the existing WDN based on whether or not WD 4 is authorized to access the one or more PFs requested to correspond to the existing WDN. In any case, WDC 6 may send a response to WD 4 that indicates whether or not the request to modify the existing WDN was accepted. For instance, WDN module 86 may send a message to WDN module 46 that indicates whether or not the request to modify the existing WDN was accepted. In some examples, the message may include a "wdnModRsp" type XML element which may be defined as provided in the XML schema below. In some examples, such as where another WD is currently docked with WDC 6, WDC 6 may perform a WDN list change procedure, such as the example WDN list change procedure described above with reference to FIG. 4F, to notify the other WD that the existing WDN has been modified.

In some examples, configuration information for the modified WDN may be stored at WD 4, WDC 6, or both. In some examples, support of the WD-Centric WDN modification procedure may be optional on both WD 4 and WDC 6. In some examples, WDC 6 may indicate whether the WD-Centric WDN modification procedure is supported during the pre-association discovery phase.

FIG. 6J illustrates an example data flow between WD 4 and WDC 6 during the performance of an example WD triggered WDN deletion procedure. As illustrated by FIG. 6J, WD 4 may send a WDN delete request to WDC 6. For instance, WDN module 46 may send a message to WDN module 86 that includes a request to delete an existing WDN of the one or more WDNs configured for use on WDC 6. In some examples, the request may include an indication of the existing WDN. In some examples, WDN module 46 may include a "wdnDeleteReq" type XML element in the request which may be defined as provided in the XML schema below.

Responsive to receiving the request from WD 4, WDC 6 may determine whether to accept or reject the request to delete the existing WDN. For instance, WDN module 86 may determine whether to accept or reject the request to delete the existing WDN based on whether or not WD 4 is authorized to delete the existing WDN. WDC 6 may send a response to WD 4 that indicates whether or not the request to delete the existing WDN was accepted. For instance, WDN module 86 may send a message to WDN module 46 that indicates whether or not the request to delete the existing WDN was accepted. In some examples, the message may include a "wdnDeleteRsp" type XML element which may be defined as provided in the XML schema below. In some examples, such as where another WD is currently docked with WDC 6, WDC 6 may perform a WDN list change procedure, such as the example WDN list change procedure described above with reference to FIG. 4F, to notify the other WD that the existing WDN has been deleted.

In some examples, support of the WD-triggered WD-Centric WDN deletion procedure may be optional on both WD 4 and WDC 6. In some examples, WDC 6 may indicate whether the WD-triggered WD-Centric WDN deletion procedure is supported during the pre-association discovery phase.

FIG. 6K illustrates an example data flow between WD 4 and WDC 6 during the performance of an example WDC triggered WDN deletion procedure. As illustrated by FIG. 6K, WDC 6 may send a WDN delete notification to WD 4. For instance, WDN module 86 may send a message to WDN module 46 that includes a notification that an existing WDN of the one or more WDNs configured for use on WDC 6 has been deleted. In some examples, the notification may include an indication of the existing WDN. In some examples, WDN module 86 may include a "wdnDeleteNotif" type XML element in the notification which may be defined as provided in the XML schema below.

In some examples, support of the WDC-triggered WD-Centric WDN deletion procedure may be optional on both WD 4 and WDC 6. In some examples, WDC 6 may indicate whether the WD-triggered WDC-Centric WDN deletion procedure is supported during the pre-association discovery phase.

FIG. 7 is a communication flow diagram illustrating an example data flow between a WD and a WDC performing techniques to wirelessly dock, in accordance with one or more examples of this disclosure. The techniques of FIG. 7 may be performed by a WD and a WDC, such as WD 4 and WDC 6 illustrated in FIG. 1 and FIG. 4. For purposes of illustration, the techniques of FIG. 7 are described within the context of WD 4 and WDC 6 of FIG. 1 and FIG. 4, although computing devices having configurations different than that of WD 4 and WDC 6 may perform the techniques of FIG. 7.

In accordance with one or more techniques of this disclosure, WD 4 and WDC 6 may exchange communications as follows. WD 4 and WDC 6 may exchange WPS information (1502). For example, the user may push a button, enter a PIN, or touch an NFC interface. In some examples, WD 4 and WDC 6 may exchange the WPS information only during their first connection. WD 4 and WDC 6 may then exchange connection setup information with WPA2 (1504). In some examples, WD 4 and WDC 6 may exchange the connection setup information in response to a trigger, such as triggered WPS or selecting an icon on a UI. WD 4 and WDC 6 may then exchange ASP session setup information for the docking service (1506). WD 4 may then communicate user type authentication information within the docking service to WDC 120 (1508).

WD 4 and WDC 6 may then exchange ASP session setup information and PF Data for various PF Services (e.g., PF Services A, B, etc.). As illustrated in FIG. 7, the user type authentication information may control the admission of ASP session setup for individual PF services (1522), and/or trigger ASP session setup for individual PF services (1524).

In some examples, such as where WD 4 is not allowed to access a certain PF Service, docking as the application from the perspective of its interfaced PF Service shall not accept the ASP session setup for the corresponding PF Service. Upon the completion of the PF Service setup, WD 4 can use the PF Service(s) at WDC 6.

Figure 8:
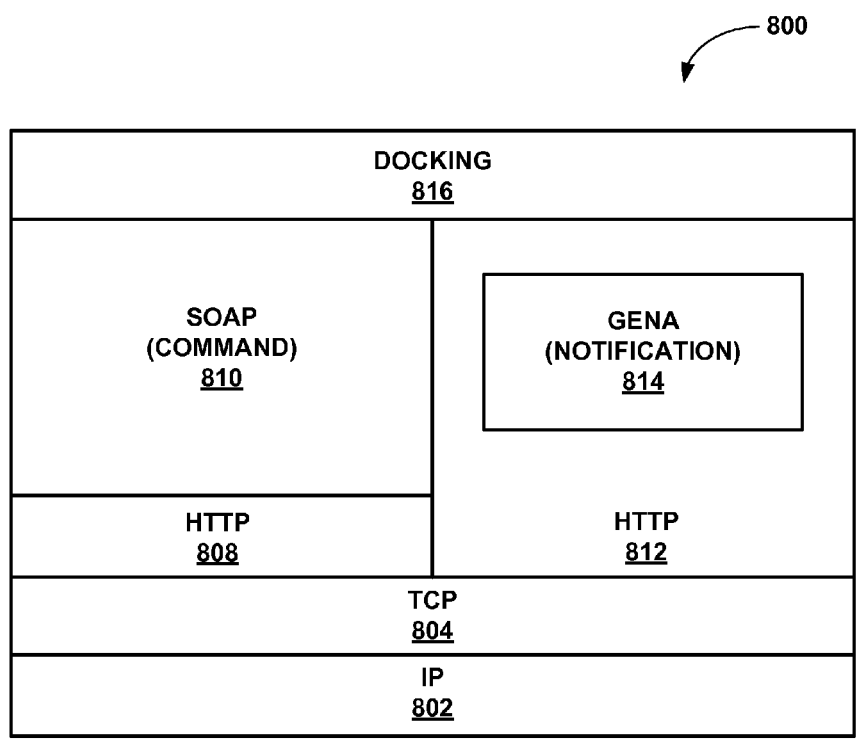
FIG. 8 is a conceptual diagram illustrating an example docking configuration and control protocol stack of an example wireless docking device, in accordance with one or more examples of this disclosure.

FIG. 8 is a conceptual diagram illustrating an example docking configuration and control protocol stack 800 of an example wireless docking device, in accordance with one or more examples of this disclosure. In some examples, docking configuration and control protocol stack 800 may be implemented by WD 4 and/or WDC 6.

As illustrated in FIG. 8 docking configuration and control protocol stack 800 includes internet (IP) layer 802, transport (TCP) layer 804, and application layer 806. Application layer 806 may include HTTP 808, simple object access protocol (SOAP) 810, HTTP 812, general event notification architecture (GENA) 814, and docking 816. In some examples, docking configuration and control protocol stack 800 may run over HTTP and may, in some examples, use SOAP and/or GENA for message transactions although other protocols are possible (e.g., UPnP). Various example message formats using plain text XML are shown below. Messages may also be formatted in other formats such as a binary protocol, in other examples.

WD 4 may use SOAP 810 to send commands (e.g., SOAP requests) to WDC 6. The Docking Service Path parameter for SOAP 810 at WDC 6 may be given during the pre-association service discovery phase.

A SOAP request from WD 4 may use the following format. The elements to be included in the SOAP body may be defined in its corresponding procedures.

```
POST [Docking Service SOAP Path] HTTP/1.1
Host: [WDC IP Address]
Content-Type: application/soap+xml; charset=utf-8
Content-Length: [nnn]
<?xml version="1.0"?>
<soap:Envelope
 xmlns:soap="http://www.w3.org/2001/12/soap-envelope"
 soap:encodingStyle="http://www.w3.org/2001/12/soap-encoding">
 <soap:Body>
  </[element name] xmlns:xsi="http://www.w3.org/2001/
XMLSchema-instance" xsi:noNamespaceSchemaLocation=
"www.wi-fi.org/xmlschema/WfaDockingServiceSchema.xsd">
   [element content]
  </[element name]>
 </soap:Body>
</soap:Envelope>
```

A SOAP response from WDC 6 may use the following format. The elements to be included in the SOAP body may be defined in its corresponding procedures.

```
HTTP/1.1 200 OK
Content-Type: application/soap+xml; charset=utf-8
Content-Length: [nnn]
<?xml version="1.0"?>
<soap:Envelope
 xmlns:soap="http://www.w3.org/2001/12/soap-envelope"
 soap:encodingStyle="http://www.w3.org/2001/12/soap-encoding">
 <soap:Body>
  </[element name] xmlns:xsi="http://www.w3.org/2001/
XMLSchema-instance" xsi:noNamespaceSchemaLocation=
"www.wi-fi.org/xmlschema/WfaDockingServiceSchema.xsd">
   [element content]
  </[element name]>
 </soap:Body>
</soap:Envelope>
```

WDC 6 may use GENA 814 send notifications to WD 4. The Docking Service Path for GENA at WDC 6 may be given during the pre-association service discovery phase.

A GENA Subscribe Request message from WD 4 may use the following format.

```
SUBSCRIBE [Docking Service GENA Path] HTTP/1.1
HOST: [WDC IP Address]
CALLBACK: <WD's IP Address/Delivery Path>
NT: wdck:event
TIMEOUT: [requested subscription duration in seconds]
```

A GENA Subscribe Response message from WDC 6 may use the following format.

```
HTTP/1.1 200 OK
DATE: [when response was generated]
SID: [subscriptionID]
CONTENT-LENGTH: 0
TIMEOUT: [actual subscription duration in seconds]
```

A GENA Unsubscribe Request message from WD 4 may use the following format.

```
UNSUBSCRIBE [Docking Service GENA Path] HTTP/1.1
HOST: [WDC's IP Address]
SID: [subscriptionID]
```

A GENA Subscribe Response message from WDC 6 may use the following format.

HTTP/1.1 200 OK

A GENA Event Notification message from WDC 6 may use the following format. The Delivery Path may be the delivery path indicated in the CALLBACK field of the GENA Subscribe message. The elements to be included in a GENA Event Notification message may be defined in its corresponding procedures.

```
NOTIFY [Delivery Path] HTTP/1.0
HOST: [WD's IP Address]
CONTENT-TYPE: text/xml; charset="utf-8"
NT: wdck:event
SID: [subscriptionID]
SEQ: [event key]
CONTENT-LENGTH: [bytes in body]
<?xml version="1.0"?>
<eventNotification
    xmlns:xsi="http://www.w3.org/2001/XMLSchema-instance"
xsi:noNamespaceSchemaLocation="www.wi-
fi.org/xmlschema/WfaDockingServiceSchema.xsd">
    [element content]
    </eventNotification>
```

Figure 9:
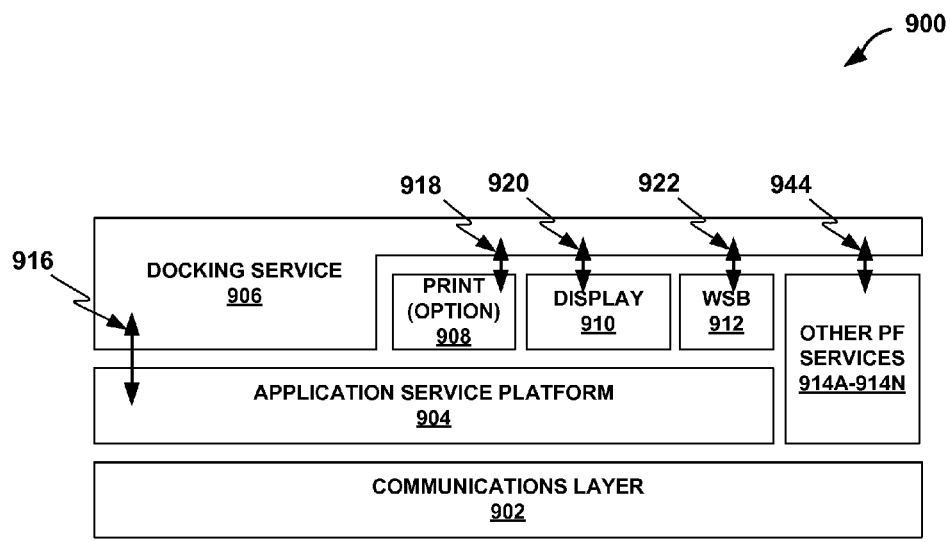
FIG. 9 a conceptual diagram illustrating example wireless docking architecture 900 that may be implemented by a wireless docking device, in accordance with one or more techniques of this disclosure.

FIG. 9 a conceptual diagram illustrating example wireless docking architecture 900 that may be implemented by a wireless docking device, in accordance with one or more techniques of this disclosure. Examples of wireless docking devices which may include architecture 900 are wireless dockees (such as WD 4 of FIG. 1 and FIG. 4) and wireless docking centers (such as WDC 6 of FIG. 1 and FIG. 4).

As illustrated in FIG. 9, architecture 900 may include communications layer 902 (e.g., Wi-Fi Direct/TDLS/Infrastructure/802.11n/ac/ad), application service platform (ASP) 904, docking service 906, print service 908, wireless display service 910 (e.g., Miracast), Wi-Fi Serial Bus (WSB) service 912, and one or more other peripheral services 914A-914N (collectively, "peripheral services 914").

As illustrated in FIG. 9, architecture 900 may define a plurality of interfaces through which docking service 906 may manage one or more other components of architecture 900. For instance, docking service 906 may manage ASP events and methods with ASP 904 via interface 916, manage print service 908 via interface 918, manage wireless display service 910 via interface 920, manage WSB 912 via interface 922, and manage peripheral services 914 via interface 944.

Docking service 906 may utilize the interfaces and events provided by ASP 904 to perform service discovery and session setup between a WD and a WDC. Where architecture 900 is implemented by a WDC, interface 916 between the docking service 906 and ASP 904 may enable docking service 906 at the WDC to perform one or more of: advertising docking service 906 (including PFs manages by docking service 906 and capabilities required to drive the use of its peripheral functions), and enable a WD to wirelessly connect to the WDC. Where architecture 900 is implemented by a WD, interface 916 between the docking service 906 and the ASP 904 may allow docking service 906 at the WD to perform the one or more of: seeking the docking service 906 at a WDC (including PFs the managed by WDC and capabilities required to drive the use of its PFs), and wirelessly connect to the WDC.

Docking service 906 may include a docking configuration and control protocol, which may be used by a WD to configure its docking session provided by a WDC, as described above.

A PF service (e.g., PF services 914) may or may not be deployed directly on top of ASP 904. Docking service 906 may communicate with the PF Services on the same docking device, serving as a management entity on top of the PF Services. Where architecture 900 is implemented by a WDC, interface 916 between docking service 906 and PF Services (e.g., print, display and WSB), may allow docking service 906 at the WDC to perform one or more of: activate and deactivate a PF service, control the WD's access to a PF service at the WDC, and configure the PF Service for a WD's use. Where architecture 900 is implemented by a WD, interface 916 between docking service 906 and PF Services (e.g., print, display and WSB), may allow docking service 906 to perform one or more of: triggering a PF service at the WD to seek and use the corresponding PF service at a WDC, and configuring the PF Service for a WD's use.

The following example definitions and terms may apply to this disclosure, (while additional definitions may be applicable in some examples):

Docking: The process of a WD learning the peripheral devices that a WDC is advertising as available and connecting to the WDC and to all or a subset of the peripherals with at most one user pairing step.

Docking Environment Type: A recommended minimum set of peripherals and the attributes to support the peripheral functions (e.g. a Docking Environment Type for 'Home Office Docking').

Peripheral Function: A logical I/O function that is not part of a WD, but can be made available to the WD through docking with a WDC.

Peripheral Function Protocol: A protocol through which a peripheral can be used/accessed through a Wi-Fi network. Examples of peripheral function protocols are WSB, Wi-Fi Display, and WiGig Display Extension.

WD: A portable device (e.g. smart phone, netbook, laptop, camera) that is capable of docking with a Wireless Docking Environment.

WDC: A logical entity that coordinates the setup of connections between a Wireless Dockee and the full set or subset of all the peripherals managed by the WDC.

Wireless Docking Environment: A generic term to denote a group of peripherals to which a WD can dock.

Figure 10:
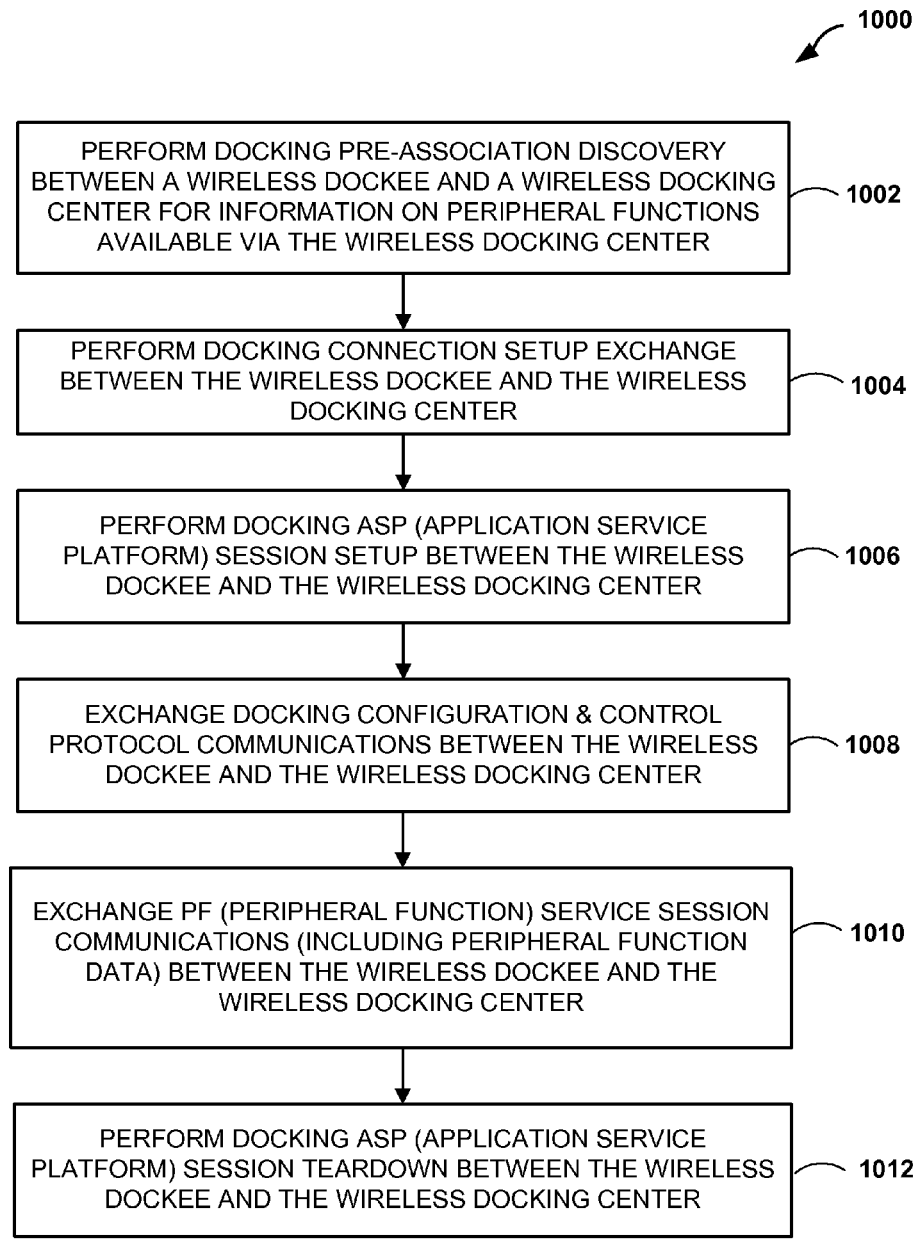
FIG. 10 is a flowchart illustrating a technique for wirelessly docking a WD and a WDC, in accordance with one or more examples of this disclosure.

The following example abbreviations and acronyms may apply to this disclosure (while additional definitions may be applicable in some examples):

ASP Application Service Platform
DET Docking Environment Type
PF Peripheral Function
PFP Peripheral Function Protocol
WD Wireless Dockee
WDC Wireless Docking Center
WDN Wireless Docking Environment
WFDS Wi-Fi Direct Services
WSB Wi-Fi Serial Bus FIG. 10 is a flowchart illustrating an technique for wirelessly docking a WD and a WDC, in accordance with one or more examples of this disclosure. The techniques of FIG. 10 may be performed by a WD and a WDC, such as WD 4 and WDC 6 illustrated in FIG. 1 and FIG. 4. For purposes of illustration, the techniques of FIG. 10 are described within the context of WD 4 and WDC 6 of FIG. 1 and FIG. 4, although computing devices having configurations different than that of WD 4 and WDC 6 may perform the techniques of FIG. 10.

The techniques of FIG. 10 may include methods implemented by WD 4 as WD 4 sends communications to WDC 6, such that WD 4 performs the indicated actions or exchanges the indicated communications, including by sending communications to WDC 6, some of which may be in response to communications WD 4 receives from WDC 6. The techniques of FIG. 10 may also include methods implemented by WDC 6 as WDC 6 sends communications to WD 4, such that WDC 6 performs the indicated actions or exchanges the indicated communications, including by sending communications to WD 4, some of which may be in response to communications WDC 6 receives from WD 4.

In various implementations of method 1000, either or both of WD 4 and WDC 6 may perform the following actions and exchange the following communications: perform docking pre-association discovery between a wireless dockee and a wireless docking center for information on peripheral functions available via the wireless docking center (1002); perform docking connection setup exchange between the wireless dockee and the wireless docking center (1004); perform docking ASP (application service platform) session setup between the wireless dockee and the wireless docking center (1006); exchange docking configuration and control protocol communications between the wireless dockee and the wireless docking center (1008); exchange PF (peripheral function) Service Session communications (including peripheral function data) between the wireless dockee and the wireless docking center (1010); and perform docking ASP (application service platform) session teardown between the wireless dockee and the wireless docking center (1012).

Figure 11:
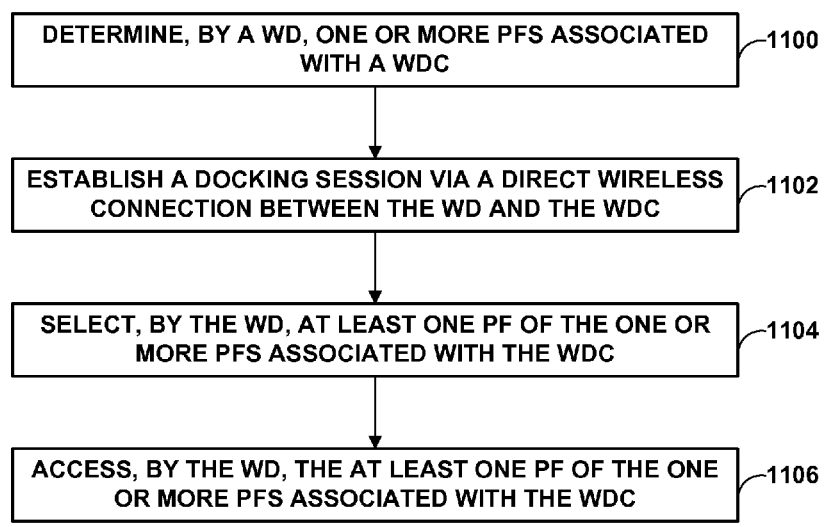
FIG. 11 is a communication flow diagram illustrating an example data flow between a WD and a WDC performing techniques to wirelessly dock, in accordance with one or more examples of this disclosure.

FIG. 11 is a communication flow diagram illustrating an example data flow between a WD and a WDC performing techniques to wirelessly dock, in accordance with one or more examples of this disclosure. The techniques of FIG. 11 may be performed by a WD and a WDC, such as WD 4 and WDC 6 illustrated in FIG. 1 and FIG. 4. For purposes of illustration, the techniques of FIG. 11 are described within the context of WD 4 and WDC 6 of FIG. 1 and FIG. 4, although computing devices having configurations different than that of WD 4 and WDC 6 may perform the techniques of FIG. 11.

In accordance with one or more techniques of this disclosure, WD 4 may determine one or more PFs associated with WDC 6 (1100). For example, WD 4 may receive a list that indicates the one or more PFs associated with WDC 6.

WD 4 may establish a docking session via a direct wireless connection between WD 4 and WDC 6 (1102). For example, WD 4 may form a P2P group that includes WD 4 and WDC 6. As another example, WD 4 may open an ASP session between a docking service of WD 4 and a corresponding docking service of WDC 6.

WD 4 may select at least one PF of the one or more PFs associated with WDC 6 (1104). For example, WD 4 may send a message to WDC 6 requesting access to at least one of the one or more PFs associated with WDC 6.

WD 4 may access the at least one PF of the one or more PFs associated with WDC 6 (1106). For instance, WD 4 may receive PF data from the at least one PF of the one or more PFs associated with WDC 6.

In some examples, when performing one or more techniques of this disclosure, a WD, such as WD 4 of FIG. 1 and FIG. 4, and/or a WDC, such as WDC 6 of FIG. 1 and FIG. 4, may call one or more Wi-Fi Direct Services (WFDS) methods. Some example WFDS methods that may be called are provided below. The parameters of one or more of the methods may be defined in WFDS Technical Specification, the entirety of which is hereby incorporated by reference. While described as being associated with certain phases (e.g., discovery, setup, teardown) each of the following methods may be called at any point during a wireless docking procedure.

One or more of the following methods may be used during service discovery and connection setup.

Docking SeekService Method

Example primitive: SeekService(service_name, exact_search, mac_address, service_information_request)

A WD that seeks for a WDC and calls the SeekService Method may specify the service_name to be "org.wi-fi.wfds.docking.wdc" with exact_search set to TRUE.

The service_information_request string specified by the WD may be either NULL or a substring of the service information text a WDC may provide.

Docking AdvertiseService Method

Example primitive: AdvertiseService(service_name, auto_accept, service_information, service_status)

A WDC that calls the AdvertiseService Method may specify the service_name to be "org.wi-fi.wfds.wsb.wdc".

The service_information may be a UTF-8 text string of XML data that may include the element "preassociationServiceDiscovery" which may be defined below.

The service_information may include information of PFs and pre-configured WDNs.

The service_information may identify the Docking Environment Type (DET) using the element "wdnType".

One or more of the following methods may be used during connection setup and docking session setup. A docking service may provide specific information to the ASP so that the ASP can use the underlining mechanisms, including P2P Provision Discovery and P2P Group Formation to set up the connection.

After the ASP session setup for the docking service, WD 4 may trigger the docking configuration and control protocol to select and configure its PFs/WDNs of interests. The docking service may performs the connection setup and ASP session setup using one or more of the following methods provided by ASP.

Docking ConnectSessions Method

Example primitive: ConnectSessions(List of(service_mac, advertisement_id), session_information, network_role)

The service seeker (e.g., WD 4) may call the ConnectSessions Method to initiate the Docking service request to the discovered service advertiser.

The session_information may be a UTF-8 string.

Docking ConfirmSession Method

Example primitive: ConfirmSession(session_mac, session_id, confirmed)

When the WDC application confirms to accept the SessionRequest Event, the WDC service may call ConfirmSession Method with the confirmed set to TRUE.

Docking BoundPort Method

Example primitive: BoundPort(session_mac, session_id, ip_address, port, proto)

The BoundPort method may be used when the docking service is deployed over IP.

The docking service may use the BoundPort Method to open one TCP port on the ASP for the docking configuration and control protocol.

The Docking Service may use one of various port values and a proto value of 6 (TCP), for example.

The following method may be used during docking session teardown. Docking session teardown may be executed using the WFDS ASP. A docking session teardown may be trigged by a docking service on either WD 4 or WDC 6. The Docking Session Teardown procedure may trigger the docking service to close the ASP session of each individual PF Service between the corresponding WDC and the WD.

WSB CloseSession Method
Example primitive: CloseSession(session_mac, session_id)
Once CloseSession is executed, the port that is not associated with any other open ASP-Sessions may be blocked again.

An example Wi-Fi Docking Schema is defined below with all elements and data types in this section. This example schema may be implemented by a WD, such as WD 4 of FIG. 1 and FIG. 4, and/or a WDC, such as WDC 6 of FIG. 1 and FIG. 4.

```
<?xml version="1.0" encoding="UTF-8"?>
<xsd:schema xmlns:xsd="http://www.w3.org/2001/XMLSchema"
    targetNamespace="http://www.wi-fi.org/xmlschema/WfaDockingServiceSchema"
    xmlns:tns="http://www.wi-fi.org/xmlschema/WfaDockingServiceSchema"
    elementFormDefault="qualified">
    <!-- A list of elements for corresponding docking configuration and control
messages. -->
    </xsd:schema>
```

A plurality of example Wi-Fi Docking specific XML simple types are defined below. In particular, a peripheralFunctionType element, a peripheralFunctionState element, a peripheralFunctionProtocol element, a wdnType element, a wdnScope element, a dockingDeviceType element, an optionalFeatureName element, a pfChangeCode element, a wdnChangeCode element, a responseCode element, and a pfSelectionStyle element are defined below. In some examples, a WD and/or a WDC may transmit one or more of the following XML elements, such as when performing one or more of the techniques described above.

```
<!-- peripheralFunctionType indicates the peripheral function type. -->
    <xsd:simpleType name="peripheralFunctionType">
        <xsd:restriction base="xsd:string">
            <xsd:enumeration value="display"/>
            <xsd:enumeration value="mouse"/>
            <xsd:enumeration value="keyboard"/>
            <xsd:enumeration value="camera"/>
            <xsd:enumeration value="storage"/>
            <xsd:enumeration value="speaker"/>
            <xsd:enumeration value="remoteControl"/>
            <xsd:enumeration value="joyStick"/>
            <xsd:enumeration value="microphone"/>
        </xsd:restriction>
    </xsd:simpleType>
<!-- peripheralFunctionState indicates the peripheral function state. -->
    <xsd:simpleType name="peripheralFunctionState">
        <xsd:restriction base="xsd:string">
            <xsd:enumeration value="available"/>
            <xsd:enumeration value="occupied"/>
            <xsd:enumeration value="sleep"/>
            <xsd:enumeration value="disconnected"/>
            <xsd:enumeration value="unpaired"/>
        </xsd:restriction>
    </xsd:simpleType>
<!-- peripheralFunctionProtocol indicates peripheral function protocol. -->
    <xsd:simpleType name="peripheralFunctionProtocol">
        <xsd:restriction base="xsd:string">
            <xsd:enumeration value="wifiDisplay"/>
            <xsd:enumeration value="wifiSerialBus"/>
            <xsd:enumeration value="wfdsPrint"/>
            <xsd:enumeration value="wfdsPlay"/>
            <xsd:enumeration value="wfdsEnable"/>
            <xsd:enumeration value="wde"/>
            <xsd:enumeration value="wbe"/>
            <xsd:enumeration value="wsd"/>
        </xsd:restriction>
    </xsd:simpleType>
<!-- wdnType indicates the Docking Environment Type. -->
```

-continued

```
    <xsd:simpleType name="wdnType">
        <xsd:restriction base="xsd:string">
            <xsd:enumeration value="homeOffice"/>
            <xsd:enumeration value="avEntertainment"/>
            <xsd:enumeration value="publicWorkplace"/>
            <xsd:enumeration value="audioOnly"/>
            <xsd:enumeration value="enterpriseOffice"/>
        </xsd:restriction>
    </xsd:simpleType>
```

-continued

```
<!-- wdnScope indicates the scope of the WDN. -->
    <xsd:simpleType name="wdnScope">
        <xsd:restriction base="xsd:string">
            <xsd:enumeration value="dockeeCentric"/>
            <xsd:enumeration value="preconfigured"/>
            <xsd:enumeration value="default"/>
        </xsd:restriction>
    </xsd:simpleType>
<!-- dockingDeviceType indicates the Docking Device Type. -->
    <xsd:simpleType name="dockingDeviceType">
        <xsd:restriction base="xsd:string">
            <xsd:enumeration value="wd"/>
            <xsd:enumeration value="wdc"/>
        </xsd:restriction>
    </xsd:simpleType>
<!-- optionalFeatureName indicates the optional docking feature. -->
    <xsd:simpleType name="optionalFeatureName">
        <xsd:restriction base="xsd:string">
            <xsd:enumeration value="userTypeAuthentication"/>
            <xsd:enumeration value="wdnSelection"/>
            <xsd:enumeration
                value="dockeeCentricWdnConfiguration"/>
        </xsd:restriction>
    </xsd:simpleType>
<!-- pfChangeCode indicates the PF Change Code. -->
    <xsd:simpleType name="pfChangeCode">
        <xsd:restriction base="xsd:string">
            <xsd:enumeration value="added"/>
            <xsd:enumeration value="removed"/>
            <xsd:enumeration value="modified"/>
        </xsd:restriction>
    </xsd:simpleType>
<!-- wdnChangeCode indicates the WDN Change Code. -->
    <xsd:simpleType name="wdnChangeCode">
        <xsd:restriction base="xsd:string">
            <xsd:enumeration value="added"/>
            <xsd:enumeration value="removed"/>
            <xsd:enumeration value="modified"/>
        </xsd:restriction>
    </xsd:simpleType>
<!-- responseCode indicates the result of the request. -->
    <xsd:simpleType name="responseCode">
        <xsd:restriction base="xsd:string">
            <xsd:enumeration value="accepted"/>
            <xsd:enumeration value="rejected"/>
        </xsd:restriction>
    </xsd:simpleType>
<!-- pfSelectionStyle indicates the PF selection style. -->
    <xsd:simpleType name="pfSelectionStyle">
        <xsd:restriction base="xsd:string">
            <xsd:enumeration value="all"/>
            <xsd:enumeration value="specific"/>
```

```
        <xsd:enumeration value="current"/>
    </xsd:restriction>
</xsd:simpleType>
```

A plurality of example Wi-Fi Docking specific XML complex types are defined below. Specifically, a peripheralFunction element, a dockingEnvironment element, and a peripheralFunctionSelection element are defined below.

```
<!-- peripheralFunction describes peripheral function information. -->
    <xsd:complexType name="peripheralFunction">
        <xsd:sequence>
            <xsd:element name="id" type="xsd:integer"></xsd:element>
            <xsd:element name="name" type="xsd:string"></xsd:element>
            <xsd:element name="type" type="tns:peripheralFunctionType"></xsd:element>
            <xsd:element name="state" type="tns:peripheralFunctionState"></xsd:element>
            <xsd:element name="pfp" type="tns:peripheralFunctionProtocol" maxOccurs="unbounded"></xsd:element>
        </xsd:sequence>
    </xsd:complexType>
<!-- dockingEnvironment describes WDN information. -->
    <xsd:complexType name="dockingEnvironment">
        <xsd:sequence>
            <xsd:element name="id" type="xsd:integer"></xsd:element>
            <xsd:element name="name" type="xsd:string"></xsd:element>
            <xsd:element name="type" type="tns:wdnType" nillable="true"></xsd:element>
            <xsd:element name="scope" type="tns:wdnScope"></xsd:element>
            <xsd:element name="pf" type="tns:peripheralFunction" maxOccurs="unbounded" minOccurs="0"></xsd:element>
        </xsd:sequence>
    </xsd:complexType>
<!-- peripheralFunctionSelection specifies PF Selection Information. -->
    <xsd:complexType name="peripheralFunctionSelection">
        <xsd:sequence>
            <xsd:element name="pfId" type="xsd:integer"></xsd:element>
            <xsd:element name="pfp" type="tns:peripheralFunctionProtocol"></xsd:element>
            <xsd:element name="isRequired" type="xsd:boolean"></xsd:element>
        </xsd:sequence>
    </xsd:complexType>
```

An example XML Element for the service_information in the Pre-Association Service Discovery is defined below. Specifically, a preassociationServiceDiscovery element is defined below.

```
<!-- preassociationServiceDiscovery specifies the service_information. -->
    <xsd:element name="preassociationServiceDiscovery" nillable="true">
        <xsd:complexType>
            <xsd:sequence>
                <xsd:element name="deviceType" type="tns:dockingDeviceType"></xsd:element>
                <xsd:element name="deviceName" type="xsd:string"></xsd:element>
                <xsd:element name="available" type="xsd:boolean"></xsd:element>
                <xsd:element name="isUserTypeAuthRequired" type="xsd:boolean"></xsd:element>
                <xsd:element name="optionalFeature" type="tns:optionalFeatureName" maxOccurs="unbounded" minOccurs="0"></xsd:element>
                <xsd:element name="pf" type="tns:peripheralFunction" maxOccurs="unbounded" minOccurs="0"></xsd:element>
                <xsd:element name="wdn" type="tns:dockingEnvironment" nillable="true" maxOccurs="unbounded" minOccurs="0"></xsd:element>
                <xsd:element name="soapPath" type="xsd:string"></xsd:element>
                <xsd:element name="genaPath" type="xsd:string"></xsd:element>
            </xsd:sequence>
        </xsd:complexType>
    </xsd:element>
```

A plurality of example XML Elements for the PF query procedure are defined below. In some examples, one or more of the example XML elements below may be transmitted by a WD or a WDC when performing a PF query procedure, such as the example PF query procedure described above with reference to FIG. 4A. For instance, when performing a PF query procedure, WD 4 may send a pfQueryReq element which may be similar to the pfQueryReq element defined below, and WDC 6 may send a pfQueryRsp element which may be similar to the pfQueryRsp element defined below.

```
<!-- pfQueryReq specifies the PF Query Request. -->
    <xsd:element name="pfQueryReq">
        <xsd:complexType>
            <xsd:sequence/>
        </xsd:complexType>
    </xsd:element>
<!-- pfQueryRsp specifies the PF Query Response. -->
    <xsd:element name="pfQueryRsp">
        <xsd:complexType>
            <xsd:sequence>
                <xsd:element name="pf" type="tns:peripheralFunction" maxOccurs="unbounded" minOccurs="0"></xsd:element>
            </xsd:sequence>
        </xsd:complexType>
    </xsd:element>
```

A plurality of example XML Elements for the PF selection and configuration procedure are defined below. In some examples, one or more of the example XML elements below may be transmitted by a WD or a WDC when performing a PF selection and configuration procedure, such as the example PF selection and configuration procedure described above with reference to FIG. 4B. For instance, when performing a PF selection and configuration procedure, WD 4 may send a pfSelectionReq element which may be similar to the pfSelectionReq element defined below, and WDC 6 send a pfSelectionRsp element which may be similar to the pfSelectionRsp element defined below.

```
<!-- pfSelectionReq specifies the PF Selection Request. -->
    <xsd:element name="pfSelectionReq">
        <xsd:complexType>
            <xsd:sequence>
                <xsd:element name="selectionStyle" type="tns:pfSelectionStyle"></xsd:element>
                <xsd:element name="pfSelection" type="tns:peripheralFunctionSelection" maxOccurs="unbounded"></xsd:element>
            </xsd:sequence>
        </xsd:complexType>
    </xsd:element>
<!-- pfSelectionRsp specifies the PF Selection Response. -->
    <xsd:element name="pfSelectionRsp">
        <xsd:complexType>
            <xsd:sequence>
                <xsd:element name="result" type="tns:responseCode"></xsd:element>
            </xsd:sequence>
        </xsd:complexType>
    </xsd:element>
```

An XML Elements for an example PF change notification procedure are defined below. In some examples, one or more of the example XML elements below may be transmitted by a WD or a WDC when performing a PF change notification procedure, such as the example PF change notification procedure described above with reference to FIG. 4C. For instance, when performing a PF change notification procedure, WDC 6 may send a pfChangeNotif element which may be similar to the pfChangeNotif element defined below.

```
<!-- pfChangeNotif specifies the PF Change Notification. -->
    <xsd:element name="pfChangeNotif">
        <xsd:complexType>
            <xsd:sequence>
                <xsd:element name="changedPf" maxOccurs="unbounded">
                    <xsd:complexType>
                        <xsd:sequence>
                            <xsd:element name="pf" type="tns:peripheralFunction"></xsd:element>
                            <xsd:element name="changeCode" type="tns:pfChangeCode"></xsd:element>
                        </xsd:sequence>
                    </xsd:complexType>
                </xsd:element>
            </xsd:sequence>
        </xsd:complexType>
    </xsd:element>
```

A plurality of example XML Elements for an example WDN query procedure are defined below. In some examples, one or more of the example XML elements below may be transmitted by a WD or a WDC when performing a WDN query procedure, such as the example WDN query procedure described above with reference to FIG. 4D. For instance, when performing a WDN query procedure, WD 4 may send a wdnQueryReq element which may be similar to the wdnQueryReq element defined below, and WDC 6 may send a wdnQueryRsp element which may be similar to the wdnQueryRsp element defined below.

```
<!-- wdnQueryReq specifies the WDN Query Request. -->
    <xsd:element name="wdnQueryReq">
        <xsd:complexType>
            <xsd:sequence/>
        </xsd:complexType>
    </xsd:element>
<!-- wdnQueryRsp specifies the WDN Query Response. -->
    <xsd:element name="wdnQueryRsp">
        <xsd:complexType>
            <xsd:sequence>
                <xsd:element name="wdn" type="tns:dockingEnvironment" maxOccurs="unbounded" minOccurs="0"></xsd:element>
            </xsd:sequence>
        </xsd:complexType>
    </xsd:element>
```

A plurality of example XML Elements for an example WDN selection procedure are defined below. In some examples, one or more of the example XML elements below may be transmitted by a WD or a WDC when performing a WDN selection procedure, such as the example WDN selection procedure described above with reference to FIG. 4E. For instance, when performing a WDN selection procedure, WD 4 may send a wdnSelectionReq element which may be similar to the wdnSelectionReq element defined below, and WDC 6 may send a wdnSelectionRsp element which may be similar to the wdnSelectionRsp element defined below.

```
<!-- wdnSelectionReq specifies the WDN Selection Request. -->
    <xsd:element name="wdnSelectionReq">
        <xsd:complexType>
            <xsd:sequence>
                <xsd:element name="wdnId" type="xsd:integer"></xsd:element>
            </xsd:sequence>
        </xsd:complexType>
    </xsd:element>
<!-- wdnSelectionRsp specifies the WDN Selection Response. -->
    <xsd:element name="wdnSelectionRsp">
        <xsd:complexType>
            <xsd:sequence>
                <xsd:element name="result" type="tns:responseCode"></xsd:element>
            </xsd:sequence>
        </xsd:complexType>
    </xsd:element>
```

An XML Elements for an example WDN change notification procedure are defined below. In some examples, one or more of the example XML elements below may be transmitted by a WD or a WDC when performing a WDN change notification procedure, such as the example WDN change notification procedure described above with reference to FIG. 4F. For instance, when performing a WDN change notification procedure, WDC 6 may send a wdnChangeNotif element which may be similar to the wdnChangeNotif element defined below.

```
<!-- wdnChangeNotif specifies the WDN Change Notification. -->
    <xsd:element name="wdnChangeNotif">
        <xsd:complexType>
            <xsd:sequence>
                <xsd:element name="changedWdn" maxOccurs="unbounded">
```

```
                <xsd:complexType>
                    <xsd:sequence>
                        <xsd:element name="wdn"
type="tns:dockingEnvironment"></xsd:element>
                        <xsd:element name="changeCode"
type="tns:wdnChangeCode"></xsd:element>
                    </xsd:sequence>
                </xsd:complexType>
            </xsd:element>
        </xsd:sequence>
    </xsd:complexType>
</xsd:element>
```

A plurality of example XML Elements for an example user type authentication procedure are defined below. In some examples, one or more of the example XML elements below may be transmitted by a WD or a WDC when performing a user type authentication procedure, such as the example user type authentication procedure described above with reference to FIG. 4G. For instance, when performing a user type authentication procedure, WD 4 may send a userTypeAuthReq element which may be similar to the userTypeAuthReq element defined below, and WDC 6 may send a userTypeAuthRsp element which may be similar to the userTypeAuthRsp element defined below.

```
<!-- userTypeAuthReq specifies the User Type Authentication
Request. -->
    <xsd:element name="userTypeAuthReq" nillable="true">
        <xsd:complexType>
            <xsd:sequence>
                <xsd:element name="userType"
type="xsd:string"></xsd:element>
                <xsd:element name="passphrase"
type="xsd:string"></xsd:element>
            </xsd:sequence>
        </xsd:complexType>
    </xsd:element>
<!-- userTypeAuthRsp specifies the User Type Authentication
Response. -->
    <xsd:element name="userTypeAuthRsp" nillable="true">
        <xsd:complexType>
            <xsd:sequence>
                <xsd:element name="result"
type="tns:responseCode"></xsd:element>
            </xsd:sequence>
        </xsd:complexType>
    </xsd:element>
```

A plurality of example XML Elements for an example WDN creation procedure are defined below. In some examples, one or more of the example XML elements below may be transmitted by a WD or a WDC when performing a WDN creation procedure, such as the example WDN creation procedure described above with reference to FIG. 4H. For instance, when performing a WDN creation procedure, WD 4 may send a wdnCreateReq element which may be similar to the wdnCreateReq element defined below, and WDC 6 may send a wdnCreateRsp element which may be similar to the wdnCreateRsp element defined below.

```
<!-- wdnCreateReq specifies the WDN Create Request. -->
    <xsd:element name="wdnCreateReq">
        <xsd:complexType>
            <xsd:sequence>
                <xsd:element name="selectionStyle"
type="tns:pfSelectionStyle"></xsd:element>
                <xsd:element name="pfSelection"
type="tns:peripheralFunctionSelection"
maxOccurs="unbounded"></xsd:element>
            </xsd:sequence>
        </xsd:complexType>
    </xsd:element>
<!-- wdnCreateRsp specifies the WDN Create Response. -->
    <xsd:element name="wdnCreateRsp">
        <xsd:complexType>
            <xsd:sequence>
                <xsd:element name="result"
type="tns:responseCode"></xsd:element>
                <xsd:element name="wdnId"
type="xsd:integer"></xsd:element>
            </xsd:sequence>
        </xsd:complexType>
    </xsd:element>
```

A plurality of example XML Elements for an example WDN modification procedure are defined below. In some examples, one or more of the example XML elements below may be transmitted by a WD or a WDC when performing a WDN modification procedure, such as the example WDN modification procedure described above with reference to FIG. 4I. For instance, when performing a WDN modification procedure, WD 4 may send a wdnModReq element which may be similar to the wdnModReq element defined below, and WDC 6 may send a wdnModRsp element which may be similar to the wdnModRsp element defined below.

```
<!-- wdnModReq specifies the WDN Modify Request. -->
    <xsd:element name="wdnModReq">
        <xsd:complexType>
            <xsd:sequence>
                <xsd:element name="wdnId"
type="xsd:integer"></xsd:element>
                <xsd:element name="pfSelection"
type="tns:peripheralFunctionSelection"
maxOccurs="unbounded"></xsd:element>
            </xsd:sequence>
        </xsd:complexType>
    </xsd:element>
<!-- wdnModRsp specifies the WDN Modify Response. -->
    <xsd:element name="wdnModRsp">
        <xsd:complexType>
            <xsd:sequence>
                <xsd:element name="result"
type="tns:responseCode"></xsd:element>
            </xsd:sequence>
        </xsd:complexType>
    </xsd:element>
```

A plurality of example XML Elements for an example WDN deletion procedure are defined below. In some examples, one or more of the example XML elements below may be transmitted by a WD or a WDC when performing a WDN deletion procedure, such as the example WDN deletion procedure described above with reference to FIG. 4J. For instance, when performing a WDN deletion procedure, WD 4 may send a wdnDeleteReq element which may be similar to the wdnDeleteReq element defined below, and WDC 6 may send a wdnDeleteRsp element which may be similar to the wdnDeleteRsp element defined below.

```
<!-- wdnDeleteReq specifies the WDN Delete Request. -->
    <xsd:element name="wdnDeleteReq">
        <xsd:complexType>
            <xsd:sequence>
                <xsd:element name="wdnId"
type="xsd:integer"></xsd:element>
            </xsd:sequence>
```

-continued

```
        </xsd:complexType>
    </xsd:element>
    <!-- wdnDeleteRsp specifies the WDN Delete Response. -->
    <xsd:element name="wdnDeleteRsp">
        <xsd:complexType>
            <xsd:sequence>
                <xsd:element name="results"
type="tns:responseCode"></xsd:element>
            </xsd:sequence>
        </xsd:complexType>
    </xsd:element>
    <!-- wdnDeleteNotif specifies the WDN Delete Notification. -->
    <xsd:element name="wdnDeleteNotif">
        <xsd:complexType>
            <xsd:sequence>
                <xsd:element name="wdnId"
type="xsd:integer"></xsd:element>
            </xsd:sequence>
        </xsd:complexType>
    </xsd:element>
```

Example 1

A method comprising: receiving, by a wireless docking center (WDC) and from a wireless dockee (WD), a request to access one or more peripheral functions (PFs) associated with the WDC; receiving, by the WDC and from the WD, one or more authentication credentials; determining, by the WDC, whether or not the one or more authentication credentials received from the WD grant access to the one or more PFs to which the WD requests access; and in response to determining that the one or more authentication credentials grant access to a first PF of the one or more PFs to which the WD requests access, permitting, by the WDC, the WD to access the first PF.

Example 2

The method of example 1, further comprising: in response to determining that the one or more authentication credentials do not grant access to a second PF one of the one or more PFs to which the WD requests access, preventing, by the WDC, the WD from accessing the second PF.

Example 3

The method of any combination of examples 1-2, wherein the one or more authentication credentials indicate one or more of: a user type, and a passphrase.

Example 4

The method of any combination of examples 1-3, further comprising: receiving, by the WDC and from the WD, a request to one or more of: create a new WDN for use at the WDC; modify an existing WDN associated with the WDC; and delete the existing WDN associated with the WDC; determining, by the WDC, whether or not the one or more authentication credentials received from the WD grant authority to complete the request; in response to determining that the one or more authentication credentials grant authority to complete the request, sending, by the WDC and to the WD, a message indicating that the WDC accepts the request; and in response to determining that the one or more authentication credentials do not grant authority to complete the request, sending, by the WDC and to the WD, a message indicating that the WDC does not accept the request.

Example 5

A wireless docking center (WDC) comprising: a memory; one or more processors; at least one module executable by the one or more processors to: receive, from a wireless dockee (WD), a request to access one or more peripheral functions (PFs) associated with the WDC; receive, from the WD, one or more authentication credentials; determine whether or not the one or more authentication credentials received from the WD grant access to the one or more PFs to which the WD requests access; and in response to determining that the one or more authentication credentials grant access to a first PF of the one or more PFs to which the WD requests access, permitting, by the WDC, the WD to access the first PF.

Example 6

The WDC of example 5, wherein the at least one module is further executable by the one or more processors to perform any combination of the method of examples 1-4.

Example 7

A wireless docking center (WDC) comprising: means for receiving, from a wireless dockee (WD), a request to access one or more peripheral functions (PFs) associated with the WDC; means for receiving, from the WD, one or more authentication credentials; means for determining whether or not the one or more authentication credentials received from the WD grant access to the one or more PFs to which the WD requests access; and means for permitting the WD to access a first PF of the one of the one or more PFs to which the WD requests access in response to determining that the one or more authentication credentials grant access to the first PF.

Example 8

The WDC of example 7, further comprising means for performing any combination of the method of examples 1-4.

Example 9

A non-transitory computer-readable storage medium stores instructions that, when executed, cause one or more processors of a wireless docking center (WDC) to: receive, from a wireless dockee (WD), a request to access one or more peripheral functions (PFs) associated with the WDC; receive, from the WD, one or more authentication credentials; determine whether or not the one or more authentication credentials received from the WD grant access to the one or more PFs to which the WD requests access; and in response to determining that the one or more authentication credentials grant access to a first PF of the one or more PFs to which the WD requests access, permit, by the WDC, the WD to access the first PF.

Example 10

The non-transitory computer-readable storage medium of example 9, further storing instructions that, when executed, cause one or more processors of the WD to perform any combination of the method of examples 1-4.

Example 11

A method comprising: sending, by a wireless dockee (WD) and to a wireless docking center (WDC), a request to access one or more peripheral functions (PFs) associated with the WDC; sending, by the WD and to the WDC, one or more authentication credentials; determining, by the WD, whether or not the one or more authentication credentials sent to the WDC grant access to the one or more PFs to which the WD requests access; and in response to determining that the one or more authentication credentials grant access to a first PF of the one or more PFs to which the WD requests access, accessing, by the WD, the first PF.

Example 12

The method of example 11, wherein the one or more authentication credentials indicate one or more of: a user type, and a passphrase.

Example 13

The method of any combination of examples 11-12, further comprising: sending, by the WD and to the WDC, a request to one or more of: create a new WDN for use at the WDC; modify an existing WDN associated with the WDC; and delete the existing WDN associated with the WDC; receiving, by the WD and from the WDC, a message indicating whether or not the WDC accepts the request.

Example 14

A wireless dockee (WD) comprising: a memory; one or more processors; at least one module executable by the one or more processors to: send, to a wireless docking center (WDC), a request to access one or more peripheral functions (PFs) associated with the WDC; send, to the WDC, one or more authentication credentials; determine whether or not the one or more authentication credentials sent to the WDC grant access to the one or more PFs to which the WD requests access; and in response to determining that the one or more authentication credentials grant access to a first PF of the one or more PFs to which the WD requests access, accessing, by the WD, the first PF.

Example 15

The WD of example 14, wherein the at least one module is further executable by the one or more processors to perform any combination of the method of examples 11-13.

Example 16

A wireless dockee (WD) comprising: means for sending, to a wireless docking center (WDC), a request to access one or more peripheral functions (PFs) associated with the WDC; means for sending, by the WD and to the WDC, one or more authentication credentials; means for determining, by the WD, whether or not the one or more authentication credentials sent to the WDC grant access to the one or more PFs to which the WD requests access; and means for accessing a first PF of the one or more PFs to which the WD requests access in response to determining that the one or more authentication credentials grant access to the first PF.

Example 17

The WD of example 16, further comprising means for performing any combination of the method of examples 11-13.

Example 18

A non-transitory computer-readable storage medium stores instructions that, when executed, cause one or more processors of a wireless dockee (WD) to: send, to a wireless docking center (WDC), a request to access one or more peripheral functions (PFs) associated with the WDC; send, to the WDC, one or more authentication credentials; determine whether or not the one or more authentication credentials sent to the WDC grant access to the one or more PFs to which the WD requests access; and in response to determining that the one or more authentication credentials grant access to a first PF of the one or more PFs to which the WD requests access, access the first PF.

Example 19

The non-transitory computer-readable storage medium of example 18, further storing instructions that, when executed, cause one or more processors of the WD to perform any combination of the method of examples 11-13.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method for wireless docking, the method comprising:
    performing, by a wireless docking center (WDC) and with a wireless dockee (WD), pre-association discovery by at least sending, by the WDC and to the WD, an indication that user type authentication is supported by the WDC;
    receiving, by the WDC and from the WD, a request to one or more of:
        create a new wireless docking environment (WDN) for use at the WDC;
        modify an existing WDN associated with the WDC; and
        delete the existing WDN associated with the WDC; and
    performing user type authentication by at least:
        receiving, by the WDC and from the WD, one or more authentication credentials that corresponds to a user of the WD;
        determining, by the WDC, whether or not the one or more authentication credentials received from the WD grant authority to complete the request; and
        in response to determining that the one or more authentication credentials grant access to complete the request, sending, by the WDC and to the WD, a message indicating that the WDC accepts the request.

2. The method of claim 1, further comprising:
    receiving, by the WDC and from the WD, a request to access one or more peripheral functions (PFs) associated with the WDC;
    determining, by the WDC, whether or not the one or more authentication credentials received from the WD grant access to the one or more PFs to which the WD requests access;
    in response to determining that the one or more authentication credentials grant access to a first PF of the one or more PFs to which the WD requests access, permitting, by the WDC, the WD to access the first PF; and
    in response to determining that the one or more authentication credentials do not grant access to a second PF one of the one or more PFs to which the WD requests access, preventing, by the WDC, the WD from accessing the second PF.

3. The method of claim 1, wherein the one or more authentication credentials indicate one or more of:
    a user type, and
    a passphrase.

4. The method of claim 1, further comprising:
    in response to determining that the one or more authentication credentials do not grant authority to complete the request, sending, by the WDC and to the WD, a message indicating that the WDC does not accept the request.

5. A wireless docking center (WDC) comprising:
    a memory;
    one or more processors;
    at least one module executable by the one or more processors to:
        perform, with a wireless dockee (WD), pre-association discovery by at least sending, by the WDC and to the WD, an indication that user type authentication is supported by the WDC;
        receive, from the WD, a request to one or more of:
            create a new wireless docking environment (WDN) for use at the WDC;
            modify an existing WDN associated with the WDC; and
            delete the existing WDN associated with the WDC; and
        perform user type authentication, wherein to perform user type authentication, the at least one module is executable by the one or more processors to:
            receive, from the WD, one or more authentication credentials that correspond to a user of the WD;
            determine whether or not the one or more authentication credentials received from the WD grant authority to complete the request; and
            in response to determining that the one or more authentication credentials grant access to complete the request, send, to the WD, a message indicating that the WDC accepts the request.

6. The WDC of claim 5, wherein the at least one module is further executable by the one or more processors to:
    receive, from the WD, a request to access one or more peripheral functions (PFs) associated with the WDC;
    determine whether or not the one or more authentication credentials received from the WD grant access to the one or more PFs to which the WD requests access;
    in response to determining that the one or more authentication credentials grant access to a first PF of the one or more PFs to which the WD requests access, permit the WD to access the first PF; and
    in response to determining that the one or more authentication credentials do not grant access to a second PF one of the one or more PFs to which the WD requests access, prevent the WD from accessing the second PF.

7. The WDC of claim 5, wherein the one or more authentication credentials indicate one or more of:
  a user type, and
  a passphrase.

8. The WDC of claim 5, wherein the at least one module is further executable by the one or more processors to:
  in response to determining that the one or more authentication credentials do not grant authority to complete the request, send, to the WD, a message indicating that the WDC does not accept the request.

9. A wireless docking center (WDC) comprising:
  means for performing, with a wireless dockee (WD), pre-association discovery by at least sending, by the WDC and to the WD, an indication that user type authentication is supported by the WDC;
  means for receiving, from the WD, a request to one or more of:
    create a new wireless docking environment (WDN) for use at the WDC;
    modify an existing WDN associated with the WDC; and
    delete the existing WDN associated with the WDC; and
  means for performing user type authentication comprising:
    means for receiving, from the WD, one or more authentication credentials that correspond to a user of the WD;
    means for determining whether or not the one or more authentication credentials received from the WD grant authority to complete the request; and
    means for sending, to the WD and in response to determining that the one or more authentication credentials grant access to complete the request, a message indicating that the WDC accepts the request.

10. The WDC of claim 9, further comprising:
  means for receiving, from the WD, a request to access one or more peripheral functions (PFs) associated with the WDC;
  means for determining whether or not the one or more authentication credentials received from the WD grant access to the one or more PFs to which the WD requests access;
  means for permitting, in response to determining that the one or more authentication credentials grant access to a first PF of the one or more PFs to which the WD requests access, the WD to access the first PF; and
  means for preventing the WD from accessing a second PF of the one or more PFs to which the WD requests access in response to determining that the one or more authentication credentials do not grant access to the second PF.

11. A non-transitory computer-readable storage medium stores instructions that, when executed, cause one or more processors of a wireless docking center (WDC) to:
  perform, with a wireless dockee (WD), pre-association discovery by at least sending, by the WDC and to the WD, an indication that user type authentication is supported by the WDC;
  receive, from the WD, a request to one or more of:
    create a new wireless docking environment (WDN) for use at the WDC;
    modify an existing WDN associated with the WDC; and
    delete the existing WDN associated with the WDC; and
  perform user type authentication, wherein the instructions that cause the one or more processors to perform the user type authentication comprise instructions that cause the one or more processors to:
    receive, from the WD, one or more authentication credentials that correspond to a user of the WD;
    determine whether or not the one or more authentication credentials received from the WD grant authority to complete the request; and
    in response to determining that the one or more authentication credentials grant access to complete the request, send, to the WD, a message indicating that the WDC accepts the request.

12. The non-transitory computer-readable storage medium of claim 11, further storing instructions that, when executed, cause one or more processors of the WDC to:
  receive, from the WD, a request to access one or more peripheral functions (PFs) associated with the WDC;
  determine whether or not the one or more authentication credentials received from the WD grant access to the one or more PFs to which the WD requests access;
  in response to determining that the one or more authentication credentials grant access to a first PF of the one or more PFs to which the WD requests access, permit the WD to access the first PF; and
  prevent the WD from accessing a second PF of the one or more PFs to which the WD requests access in response to determining that the one or more authentication credentials do not grant access to the second PF.

13. A method for wireless docking, the method comprising:
  performing, by a wireless dockee (WD) and with a wireless docking center (WDC), pre-association discovery by at least receiving, by the WD and from the WDC, an indication that user type authentication is supported by the WDC;
  sending, by the WD and to the WDC, a request to access one or more peripheral functions (PFs) associated with the WDC;
  sending, by the WD and to the WDC, a request to one or more of:
    create a new wireless docking environment (WDN) for use at the WDC;
    modify an existing WDN associated with the WDC; and
    delete the existing WDN associated with the WDC;
  receiving, by the WD and from the WDC, a message indicating whether or not the WDC accepts the request; and
  performing user type authentication by at least:
    sending, by the WD and to the WDC, one or more authentication credentials that correspond to a user of the WD;
    determining, by the WD, whether or not the one or more authentication credentials sent to the WDC grant access to the one or more PFs to which the WD requests access; and
    in response to determining that the one or more authentication credentials grant access to a first PF of the one or more PFs to which the WD requests access, accessing, by the WD, the first PF.

14. The method of claim 13, wherein the one or more authentication credentials indicate one or more of:
  a user type, and
  a passphrase.

15. A wireless dockee (WD) comprising:
  a memory;
  one or more processors;

at least one module executable by the one or more processors to:
  perform, with a wireless docking center (WDC), pre-association discovery by at least receiving, by the WD and from the WDC, an indication that user type authentication is supported by the WDC;
  send, to the WDC, a request to access one or more peripheral functions (PFs) associated with the WDC;
  send, to the WDC, a request to one or more of:
    create a new wireless docking environment (WDN) for use at the WDC:
    modify an existing WDN associated with the WDC; and
    delete the existing WDN associated with the WDC;
  receive, from the WDC, a message indicating whether or not the WDC accepts the request; and
  perform user type authentication by at least:
    send, to the WDC, one or more authentication credentials that correspond to a user of the WD;
    determine whether or not the one or more authentication credentials sent to the WDC grant access to the one or more PFs to which the WD requests access; and
    in response to determining that the one or more authentication credentials grant access to a first PF of the one or more PFs to which the WD requests access, accessing, by the WD, the first PF.

16. The WD of claim 15, wherein the one or more authentication credentials indicate one or more of:
  a user type, and
  a passphrase.

17. A wireless dockee (WD) comprising:
  means for performing, with a wireless docking center (WDC), pre-association discovery by at least receiving, by the WD and from the WDC, an indication that user type authentication is supported by the WDC;
  means for sending, to the WDC, a request to access one or more peripheral functions (PFs) associated with the WDC;
  means for sending, by to the WDC, a request to one or more of:
    create a new wireless docking environment (WDN) for use at the WDC;
    modify an existing WDN associated with the WDC; and
    delete the existing WDN associated with the WDC;
  means for receiving, from the WDC, a message indicating whether or not the WDC accepts the request; and
  means for performing user type authentication comprising:
    means for sending, by the WD and to the WDC, one or more authentication credentials that correspond to a user of the WD;
    means for determining, by the WD, whether or not the one or more authentication credentials sent to the WDC grant access to the one or more PFs to which the WD requests access; and
  means for accessing a first PF of the one or more PFs to which the WD requests access in response to determining that the one or more authentication credentials grant access to the first PF.

18. A non-transitory computer-readable storage medium stores instructions that, when executed, cause one or more processors of a wireless dockee (WD) to:
  perform, with a wireless docking center (WDC), pre-association discovery by at least receiving, by the WD and from the WDC, an indication that user type authentication is supported by the WDC;
  send, to the WDC, a request to access one or more peripheral functions (PFs) associated with the WDC;
  send, to the WDC, a request to one or more of:
    create a new wireless docking environment (WDN) for use at the WDC;
    modify an existing WDN associated with the WDC; and
    delete the existing WDN associated with the WDC;
  receive, from the WDC, a message indicating whether or not the WDC accepts the request; and
  perform user type authentication, wherein the instructions that cause the one or more processors to perform the user type authentication comprise instructions that cause the one or more processors to:
    send, to the WDC, one or more authentication credentials that correspond to a user of the WD;
    determine whether or not the one or more authentication credentials sent to the WDC grant access to the one or more PFs to which the WD requests access; and
    in response to determining that the one or more authentication credentials grant access to a first PF of the one or more PFs to which the WD requests access, access the first PF.

* * * * *